US012775076B2

(12) United States Patent
Yang et al.

(10) Patent No.: US 12,775,076 B2
(45) Date of Patent: Oct. 27, 2026

(54) DISTANCE MEASURING DEVICE, DISTANCE MEASURING SYSTEM, AND METHOD OF ADJUSTING DISTANCE MEASURING DEVICE

(71) Applicant: Sony Semiconductor Solutions Corporation, Kanagawa (JP)

(72) Inventors: Ying Yang, Kanagawa (JP); Kensei Jo, Tokyo (JP); Takafumi Fujita, Kanagawa (JP); Nana Matsumoto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1118 days.

(21) Appl. No.: 17/626,664

(22) PCT Filed: Jun. 12, 2020

(86) PCT No.: PCT/JP2020/023140
§ 371 (c)(1),
(2) Date: Jan. 12, 2022

(87) PCT Pub. No.: WO2021/019929
PCT Pub. Date: Feb. 4, 2021

(65) Prior Publication Data
US 2022/0260690 A1 Aug. 18, 2022

(30) Foreign Application Priority Data
Jul. 26, 2019 (JP) ................................ 2019-138251

(51) Int. Cl.

| | |
|---|---|
| ***G01S 7/4865*** | (2020.01) |
| ***G01S 7/4915*** | (2020.01) |
| ***G01S 17/10*** | (2020.01) |
| ***G01S 17/36*** | (2006.01) |

(52) U.S. Cl.
CPC .......... *G01S 7/4865* (2013.01); *G01S 7/4915* (2013.01); *G01S 17/10* (2013.01); *G01S 17/36* (2013.01)

(58) Field of Classification Search
CPC ................................ G01S 17/10; G01S 7/497
See application file for complete search history.

(56) References Cited

U.S. PATENT DOCUMENTS

2009/0122297 A1* 5/2009 Ikeno .................... G01S 17/931 356/5.09
2013/0242058 A1 9/2013 Bae
(Continued)

FOREIGN PATENT DOCUMENTS

JP 2015-172551 A 10/2015
JP 2018-031607 A 3/2018
(Continued)

OTHER PUBLICATIONS

International Search Report (PCT/ISA/210), International Application No. PCT/JP2020/023140, dated Aug. 17, 2020.
(Continued)

*Primary Examiner* — Helal A Algahaim
*Assistant Examiner* — Clara G Chilton
(74) *Attorney, Agent, or Firm* — Michael Best & Friedrich LLP

(57) ABSTRACT

Distance measuring is disclosed. In one example, a distance measuring device includes a ToF (time of flight) sensor, a distance calculation unit, a mode switching unit, and an estimation unit. The ToF sensor has a sensor clock that controls a photographing timing. The sensor clock is a device-specific clock different from a light source clock that controls a modulation frequency of a light emission pulse of a light source. The ToF sensor performs photographing by reflecting, on a surface of an object, emission light of the
(Continued)

light source that emits pulse light. The distance calculation unit calculates a distance to the object based on image data captured by the ToF sensor. The estimation unit estimates the modulation frequency of the light source generated from the light source clock based on pieces of image data captured in an operation mode switched by the mode switching unit.

19 Claims, 18 Drawing Sheets

(56) References Cited

U.S. PATENT DOCUMENTS

| | | | | |
|---|---|---|---|---|
| 2015/0285623 | A1* | 10/2015 | Tachibana | G01S 7/497<br>250/341.8 |
| 2018/0196142 | A1* | 7/2018 | Levy | G01S 19/015 |
| 2018/0259628 | A1* | 9/2018 | Plank | G01S 7/497 |

FOREIGN PATENT DOCUMENTS

| | | | |
|---|---|---|---|
| JP | 2018-036144 | A | 6/2019 |
| JP | 2019-106588 | A | 6/2019 |
| WO | 2013/09101 | A1 | 6/2013 |
| WO | 2013/091016 | A1 | 6/2013 |

OTHER PUBLICATIONS

Saab Mohamad et al: “Frequency Estimation of Multiple Components using Chinese Remainder Theorem”, 2018 25th International Conference on Telecommunications (ICT), IEEE, Jun. 26, 2018 (Jun. 26, 2018), pp. 610-616, XP033400077, DOI: 10.1109/ICT.2018.8464915 [retrieved on Sep. 13, 2018].

* cited by examiner

DISTANCE MEASURING DEVICE, DISTANCE MEASURING SYSTEM, AND METHOD OF ADJUSTING DISTANCE MEASURING DEVICE

FIELD

The present disclosure relates to a distance measuring device, a distance measuring system, and a method of adjusting a distance measuring device.

BACKGROUND

As one of distance measurement methods for measuring a distance to an object to be measured using light, a distance measurement method called a ToF (time of flight) method is known. The ToF method is a method of irradiating an object with light using a light source, receiving reflected light by a ToF sensor, and measuring a distance to the object by analyzing a light reception result.

In addition, there is also known a technique of irradiating an object with light from a light source separate from the ToF sensor, receiving reflected light by the ToF sensor, and measuring a distance to the object. (See, for example, Patent Literature 1.)

CITATION LIST

Patent Literature

Patent Literature 1: JP 2018-31607 A

SUMMARY

Technical Problem

However, in the above technology, since a light source and a ToF sensor are separately configured, a light source clock for the light source and a sensor clock for the ToF sensor are separate. Therefore, a modulation frequency of the light source and a modulation frequency of the ToF sensor are not always synchronized, and the frequencies may be deviated. Then, in a case where the modulation frequency of the ToF sensor deviates from the modulation frequency of the light source, an error may occur in a distance measurement result.

Therefore, the present disclosure proposes a distance measuring device, a distance measuring system, and a method of adjusting the distance measuring device capable of matching the modulation frequency of the ToF sensor with the modulation frequency of the light source.

Solution to Problem

According to the present disclosure, there is provided a distance measuring device. The distance measuring device includes a ToF (time of flight) sensor, a distance calculation unit, a mode switching unit, and an estimation unit. The ToF sensor has a device-specific clock that is the sensor clock for controlling the photographing timing and is different from the light source clock for controlling the light-emitting timing of the light source. The ToF sensor reflects the emission light of the light source emitting the pulse light on the surface of the object to perform photographing. The distance calculation unit calculates the distance to the object based on the image data captured by the ToF sensor. The mode switching unit switches the operation mode of the ToF sensor. The estimation unit estimates the modulation frequency of the light source generated from the light source clock based on a plurality pieces of image data captured by switching the operation mode by the mode switching unit.

Advantageous Effects of Invention

According to the present disclosure, a modulation frequency of a ToF sensor can be matched with a modulation frequency of a light source. Note that effects described herein are not necessarily limited, and may be any of the effects described in the present disclosure.

DESCRIPTION OF EMBODIMENTS

Hereinafter, embodiments of the present disclosure will be described with reference to the drawings. In each of the following embodiments, same parts are denoted by the same reference signs to omit redundant description.

As one of distance measurement methods for measuring a distance to an object to be measured using light, a distance measurement method called a ToF (time of flight) method is known. The ToF method is a method of irradiating an object with light using a light source, receiving reflected light by a ToF sensor, and measuring a distance to the object by analyzing a light reception result.

In addition, there is also known a technique of irradiating the object with light from a light source separate from the ToF sensor, receiving its reflected light by the ToF sensor, and measuring a distance or the like to the object. In this configuration, since the light source can be arranged near the object, an amount of light received by the ToF sensor can be increased as compared with a case where the light source and the ToF sensor are integrally configured. As a result, a distance measurement accuracy of a distance measuring device can be improved.

However, in the above technology, since a light source and a ToF sensor are separately configured, a light source clock for the light source and a sensor clock for the ToF sensor are separate.

Therefore, a modulation frequency of the light source and a modulation frequency of the ToF sensor are not always synchronized, and the frequencies may be deviated. Then, in a case where the modulation frequency of the ToF sensor deviates from the modulation frequency of the light source, an error may occur in a distance measurement result.

Therefore, it is expected to solve the above-described disadvantage and achieve a distance measuring device, a distance measuring system, and a method of adjusting the distance measuring device capable of matching the modulation frequency of the ToF sensor with the modulation frequency of the light source.

Distance Measurement Method

The present disclosure relates to a technique for measuring a distance using light. Therefore, in order to facilitate understanding of each embodiment of the present disclosure, a distance measurement method applicable to each embodiment will be described with reference to FIG. 1 to FIG. 5.

The ToF method is a method of irradiating an object with emission light and analyzing its reflected light to measure a distance (depth) to the object or a shape of the object. The following description does not particularly mention a three-dimensional shape measurement process, but the three-dimensional shape of the object can be measured by measuring a distance of an object surface over the entire object surface.

Figure 1:
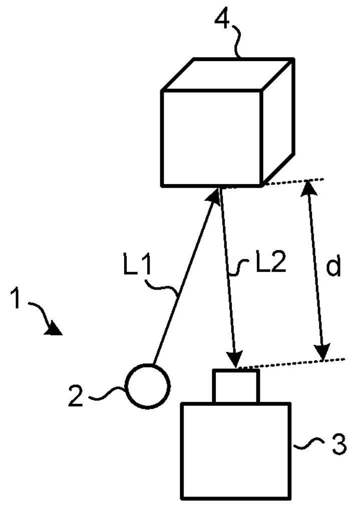
FIG. 1 is a diagram illustrating an outline of a distance measurement process using a ToF method.

FIG. 1 to FIG. 5 are diagrams illustrating an outline of a distance measurement process using the ToF method. As illustrated in FIG. 1, a distance measuring system 1 according to each embodiment includes a light source 2 and a distance measuring device 3. Then, in the distance measuring system 1, emission light L1 from the light source 2 is reflected by an object 4, and reflected light L2 is received by the distance measuring device 3.

In the ToF method generally used in the related art, since the light source 2 and the distance measuring device 3 are arranged at substantially the same position, a distance (depth) d from the distance measuring device 3 to the object 4 can be calculated using the following Expression (1) by measuring time Δt until the emission light L1 from the light source 2 is reflected by the object 4 and enters the distance measuring device 3. Note that Δt is time for light reciprocation, whereas d is a one-way distance, and thus is divided by 2.

$$d = (c/2) \times \Delta t \tag{1}$$

(c: Light velocity ($2.9979\times10^{8}$ [m/sec]))

Figure 2:
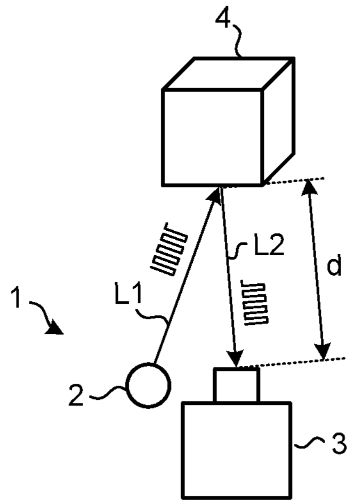
FIG. 2 is a diagram illustrating the outline of the distance measurement process using the ToF method.
Figure 3:
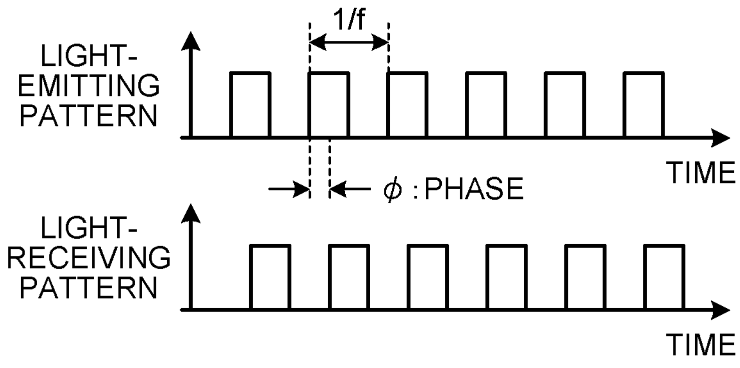
FIG. 3 is a diagram illustrating the outline of the distance measurement process using the ToF method.

On the other hand, since it is not easy to directly measure the time Δt, the distance measuring system 1 according to each embodiment emits pulse light from the light source 2 as the emission light L1 as illustrated in FIG. 2. Then, as illustrated in FIG. 3, a phase ϕ of the pulse light returned to the distance measuring device 3 (light-receiving pattern) as the reflected light L2, based on the pulse light from the light source 2 (light-emitting pattern), is converted into the time Δt.

For example, in a case where f is a frequency of the pulse light emitted from the light source 2, the time Δt can be calculated using the following Expression (2).

$$\Delta t = (1/f) \times (\phi/2\pi) \tag{2}$$

As a result, a distance d from the distance measuring device 3 to the object 4 can be calculated using the following Expression (3).

$$d = (c\phi)/4\pi f \tag{3}$$

Figure 6:
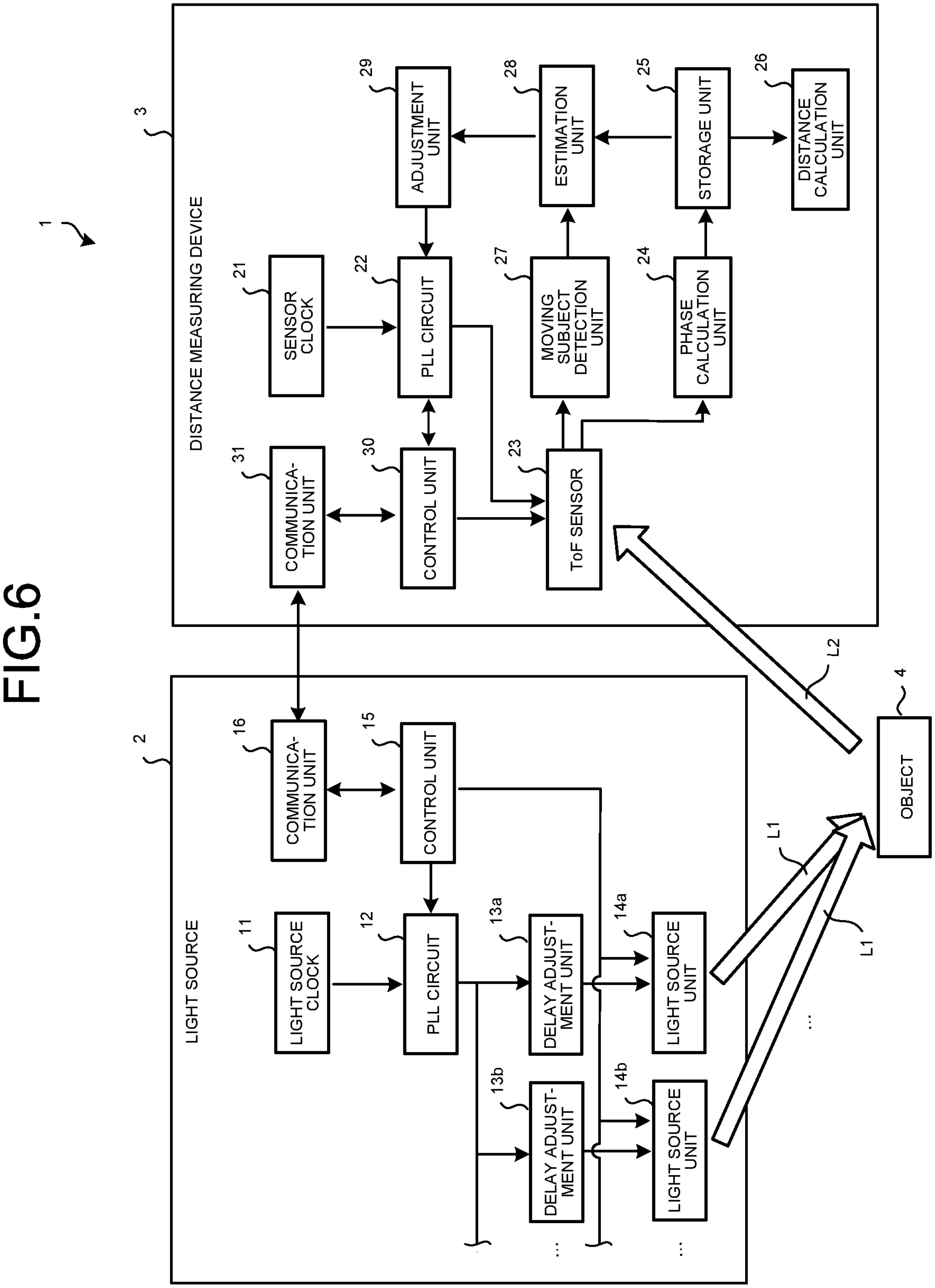
FIG. 6 is a block diagram illustrating a configuration example of a distance measuring system according to a first embodiment of the present disclosure.

Next, a method of calculating the above-described phase $\phi$ will be described with reference to FIG. 4. The distance measuring device 3 according to each embodiment includes a ToF sensor 23 (FIG. 6). The ToF sensor 23 has a function in which each pixel repeats ON/OFF at a high speed and accumulates electric charge only during an ON period.

When the ToF sensor 23 is used for measuring a distance to an object, an ON/OFF execution timing is sequentially switched to analyze accumulated charge at each timing. There are, for example, the following four switching patterns of the ON/OFF execution timing as illustrated in FIG. 4.

(c1) Zero-degree phase
(c2) 90-degree phase
(c3) 180-degree phase
(c4) 270-degree phase Details of each switching pattern are described below.

(c1) The zero-degree phase is a setting in which an ON timing (light-receiving timing) is set to a phase of the pulse light emitted from the light source 2, that is, a phase same as a light-emitting pattern (a).

(c2) The 90-degree phase is a setting in which the ON timing (light-receiving timing) is delayed by 90 degrees from the pulse light emitted from the light source 2 ((a) light-emitting pattern).

(c3) The 180-degree phase is a setting in which the ON timing (light-receiving timing) is delayed by 180 degrees from the pulse light emitted from the light source 2 ((a) light-emitting pattern).

(c4) The 270-degree phase is a setting in which the ON timing (light-receiving timing) is delayed by 270 degrees from the pulse light emitted from the light source 2 ((a) light-emitting pattern).

The ToF sensor 23 of the distance measuring device 3 sequentially executes these four switching patterns to acquire a received light quantity at each changed light-receiving timing. In other words, four types of received light quantities with different accumulated phases and charges corresponding to the received light quantities are acquired.

Figure 4:
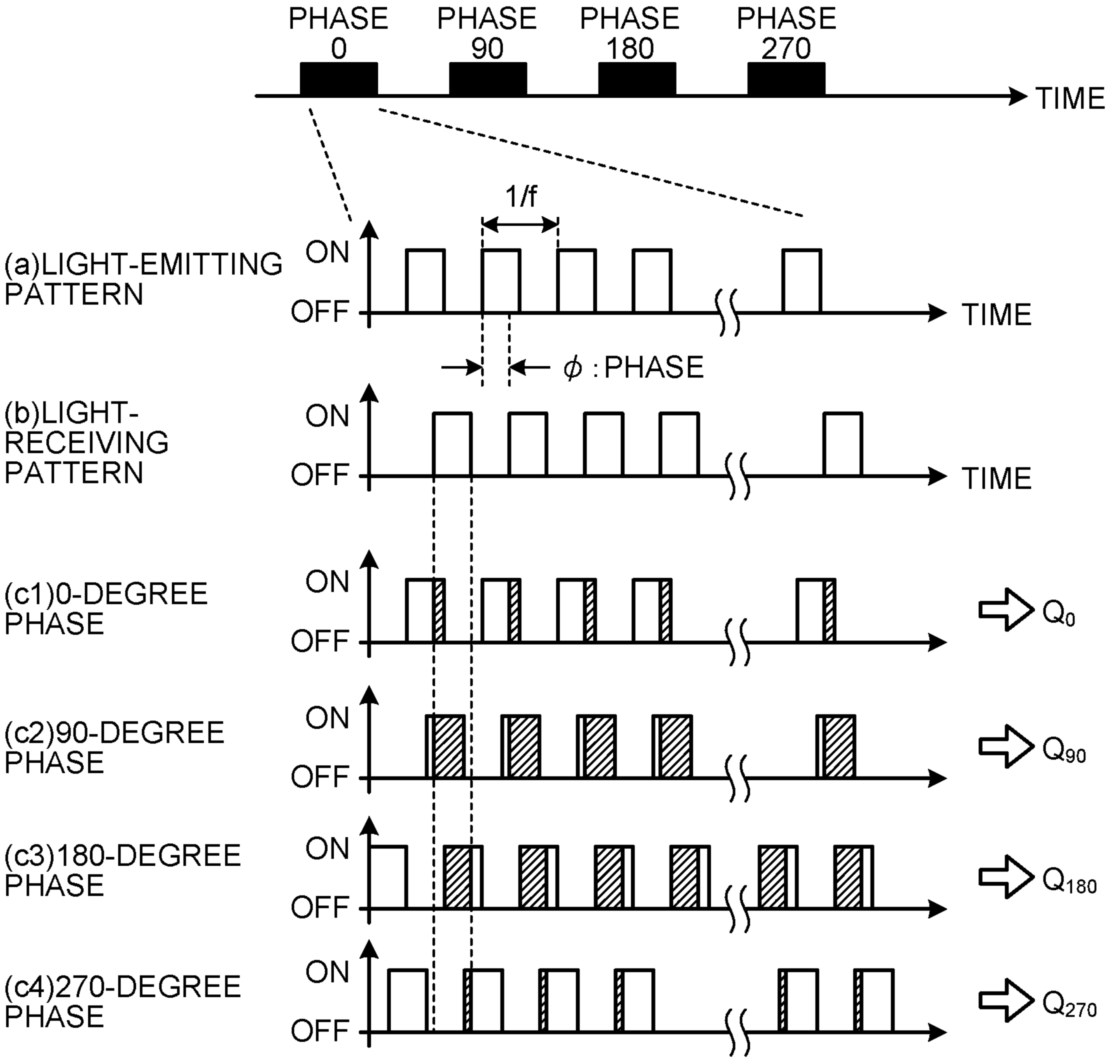
FIG. 4 is a diagram illustrating the outline of the distance measurement process using the ToF method.

Then, as illustrated in FIG. 4, when the phases of light receiving pixels with respect to the light-emitting pattern are 0 degrees, 90 degrees, 180 degrees, and 270 degrees, charges accumulated are $Q_0$, $Q_{90}$, $Q_{180}$, and $Q_{270}$, respectively.

Here, the phase $\phi$ needed for calculating the distance d to the object by applying the above-described Expression (3) is a phase of pulse light received by the distance measuring device 3 ((b) light-receiving pattern) with reference to the pulse light emitted from the light source 2. This phase $\phi$ can be calculated using the following Expression (4).

$$\phi = \mathrm{Arctan}\big((Q_{90} - Q_{270})/(Q_{180} - Q_0)\big) \tag{4}$$

Then, in the ToF method, the distance d from the distance measuring device 3 to the object 4 can be calculated by inputting the phase $\phi$ calculated by the above Expression (4) in the above Expression (3).

Figure 5:
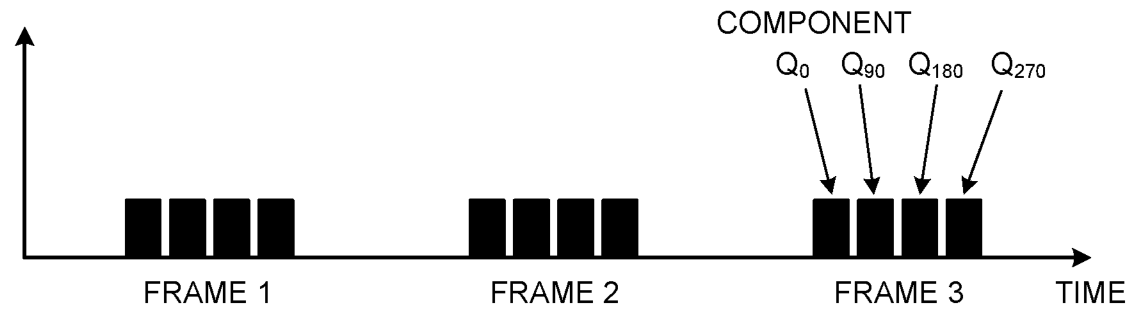
FIG. 5 is a diagram illustrating image data captured by a ToF sensor from left to right according to a time axis.

FIG. 5 is a diagram illustrating image data captured by the ToF sensor 23 from left to right according to a time axis. As illustrated in FIG. 5, in the present disclosure, in one image frame captured by the ToF sensor 23, the accumulated charge of a captured image is referred to as a "component" in phase settings in which a phase difference between a pulse light-emitting pattern and a drive pattern of a sensor pixel is 0 degrees, 90 degrees, 180 degrees, and 270 degrees.

In each embodiment, the captured images with the phase settings whose phase deviation amounts from the light-emitting pattern (pulse) are 0 degrees, 90 degrees, 180 degrees, and 270 degrees are sequentially and repeatedly captured.

In the present disclosure, a set of combinations of components of phase settings of 0 degrees, 90 degrees, 180 degrees, and 270 degrees is referred to as a "frame". In other words, one frame has information regarding the accumulated charges (components) $Q_0$, $Q_{90}$, $Q_{180}$, and $Q_{270}$ of the captured images in phase settings whose phase deviation amounts from the light-emitting pattern (pulse) are 0 degrees, 90 degrees, 180 degrees, and 270 degrees.

Note that, in the following description, an image obtained using Expression (4) is referred to as a "phase image". In each embodiment, time between the components is set to be shorter than time between the frames.

Details of Distance Measuring System

Next, details of the distance measuring system 1 according to a first embodiment will be described with reference to FIG. 6. FIG. 6 is a block diagram illustrating a configuration example of the distance measuring system 1 according to the first embodiment of the present disclosure.

As illustrated in FIG. 6, the distance measuring system 1 according to the first embodiment includes the light source 2 and the distance measuring device 3. In the first embodiment, the light source 2 and the distance measuring device 3 are configured separately. In the first embodiment, the light source 2 and the distance measuring device 3 do not necessarily need to be configured separately, and may be configured integrally.

The light source 2 emits pulse light having a predetermined modulation frequency to the object 4 as the emission light L1. The light source 2 includes a light source clock 11, a phase locked loop (PLL) circuit 12, a plurality of delay adjustment units 13*a*, 13*b*, and so on, a plurality of light source units 14*a*, 14*b*, and so on, a control unit 15, and a communication unit 16.

The light source clock 11 generates a clock signal having a predetermined frequency $f_{CL1}$. The PLL circuit 12 multiplies by a constant number the frequency $f_{CL1}$ of the clock signal generated by the light source clock 11 to generate a pulse signal having a predetermined modulation frequency $f_L$.

For example, when the frequency $f_{CL1}$ of the clock signal generated by the light source clock 11 is multiplied by $C_L$ in the PLL circuit 12, the modulation frequency $f_L$ of the pulse signal generated by the PLL circuit 12 is $f_L=C_L\times f_{CL1}$. In the following description, $C_L$ set in the PLL circuit 12 is also referred to as a "PLL coefficient".

In this manner, by providing the PLL circuit 12 in association with the light source clock 11 and changing the PLL coefficient $C_L$ of the PLL circuit 12, a plurality of modulation frequencies $f_L$ can be generated from one light source clock 11.

The delay adjustment units 13*a*, 13*b*, and so on control a delay amount of a light-emitting timing in the light source units 14*a*, 14*b*, and so on according to a length of wiring from the light source clock 11 to corresponding light source units 14*a*, 14*b*, and so on.

The light source units 14*a*, 14*b*, and so on emit the pulse light corresponding to a pulse signal generated by the PLL circuit 12 as the emission light L1. For example, the light source units 14*a*, 14*b*, and so on emit the pulse light having the above-described modulation frequency $f_L$.

The light source units 14a, 14b, and so on are configured with, for example, a laser diode such as a vertical cavity surface emitting laser (VCSEL). Note that the light source units 14a, 14b, and so on are not limited to the VCSEL, and a laser diode array or the like in which laser diodes are aligned may be used.

The control unit 15 controls the entire operation of the light source 2 according to, for example, a program incorporated in advance. For example, the control unit 15 can switch an operation mode of the light source 2 by controlling the PLL circuit 12 and the light source units 14a, 14b, and so on.

Specifically, the control unit 15 can control the modulation frequency $f_L$ of the emission light L1 by controlling the PLL coefficient $C_L$ of the PLL circuit 12. Furthermore, the control unit 15 can control ON/OFF of the emission light L1 by controlling the light source units 14a, 14b, and so on.

The communication unit 16 transmits and receives various types of information to and from a communication unit 31 of the distance measuring device 3. As a communication method used between the communication unit 16 and the communication unit 31, any method in a wired or wireless manner can be applied (e.g., a local area network (LAN), WiFi (registered trademark), and Bluetooth (registered trademark)). Furthermore, in the communication unit 16, the light source 2 and the distance measuring device 3 are synchronized timewise, and the light-emitting timing and the light-receiving timing are determined in advance. Note that, for example, precision time protocol (PTP) can be used for time synchronization.

The distance measuring device 3 measures the distance d (see FIG. 1) to the object 4 using the emission light from the plurality of light source units 14a, 14b, and so on. The distance measuring device 3 includes a sensor clock 21, a PLL circuit 22, the ToF sensor 23, a phase calculation unit 24, a storage unit 25, a distance calculation unit 26, a moving subject detection unit 27, an estimation unit 28, an adjustment unit 29, a control unit 30, and the communication unit 31. The control unit 30 is an example of a mode switching unit.

The sensor clock 21 generates the clock signal having a predetermined frequency $f_{CL2}$. The PLL circuit 22 multiplies by a constant number the frequency $f_{CL2}$ of the clock signal generated by the sensor clock 21 to generate a pulse signal having a predetermined modulation frequency $f_S$. In other words, when a PLL coefficient $C_S$ is the PLL coefficient of the PLL circuit 22, the modulation frequency $f_S$ is $f_S = C_S \times f_{CL2}$.

In this manner, by providing the PLL circuit 22 in association with the sensor clock 21 and changing the PLL coefficient $C_S$ of the PLL circuit 22, a plurality of modulation frequencies $f_S$ can be generated from one sensor clock 21.

As described above, the ToF sensor 23 receives the reflected light L2 from the plurality of light source units 14a, 14b, and so on at different light-receiving timings to acquire image data in which the different light-receiving timings are set. In other words, the ToF sensor 23 acquires the frame including a plurality of components $Q_0$, $Q_{90}$, $Q_{180}$, and $Q_{270}$. The sensor clock 21, the pulse signal of the modulation frequency $f_S$ generated using the PLL circuit 22, and the control unit 30 determine the light-receiving timing of the ToF sensor 23. The control unit 30 exposes the ToF sensor 23 in accordance with a predetermined light-emitting timing.

The phase calculation unit 24 calculates, using the above Expression (4), the phase $\phi$ from the data of the plurality of components $Q_0$, $Q_{90}$, $Q_{180}$, and $Q_{270}$ acquired by the ToF sensor 23. The phase calculation unit 24 calculates the phase $\phi$ for each frame.

The storage unit 25 stores a frame image including the component captured by the ToF sensor 23 and data of the phase $\phi$ calculated by the phase calculation unit 24.

The distance calculation unit 26 calculates the distance d of the object 4 to be measured from data of a difference in the phase images of the plurality of light sources stored in the storage unit 25, using the method described in Patent Literature 1. The distance d is a distance from the distance measuring device 3 to a surface of the object 4. The moving subject detection unit 27 detects a moving subject from an image captured by the ToF sensor 23.

The estimation unit 28 estimates the modulation frequency $f_L$ of the light source 2. The adjustment unit 29 adjusts the modulation frequency $f_S$ of the distance measuring device 3 based on the modulation frequency $f_L$ of the light source 2 estimated by the estimation unit 28. Details of an estimation process of the modulation frequency $f_L$ and an adjustment process of the modulation frequency $f_S$ will be described later.

The control unit 30 controls the entire operation of the distance measuring device 3 according to, for example, a program incorporated in advance. For example, the control unit 30 can switch an operation mode of the distance measuring device 3 by controlling the PLL circuit 22 and the ToF sensor 23.

Specifically, the control unit 30 can control the light-receiving timing of the ToF sensor 23 by controlling the PLL coefficient $C_S$ of the PLL circuit 22. Furthermore, the control unit 30 can control ON/OFF of reception of the reflected light L2 by controlling the ToF sensor 23.

The communication unit 31 synchronizes time of the system with the communication unit 16 of the light source 2, and transmits and receives various types of information. Examples of the various types of information include the light-emitting timing.

First Embodiment

Figure 7:
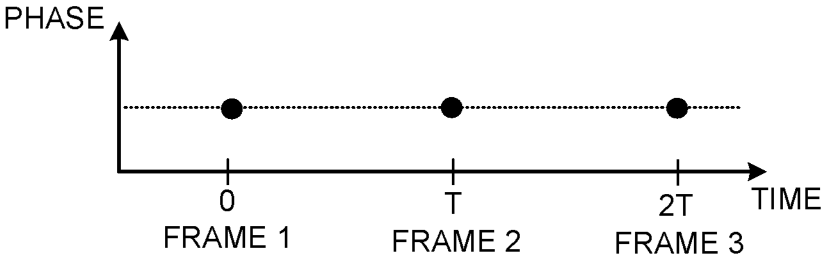
FIG. 7 is a diagram illustrating a phase change in a case where there is no deviation between a modulation frequency of a light source and a modulation frequency of a distance measuring device.

Next, details of the estimation process of the modulation frequency $f_L$ and the adjustment process of the modulation frequency $f_S$ according to the first embodiment will be described with reference to FIG. 7 to FIG. 11. FIG. 7 is a diagram illustrating a change in the phase $\phi$ of each frame in a case where there is no deviation between the modulation frequency $f_L$ of the light source 2 and the modulation frequency $f_S$ of the distance measuring device 3.

In the technique described in Patent Literature 1, the plurality of light source units 14a, 14b, and so on are employed to measure the distance d using an external light source. Since the plurality of external light source units 14a, 14b, and so on are driven by the same clock, the modulation frequency matches with modulation frequencies of other light sources by synchronizing the modulation frequency with any one of the plurality of external light source units. The plurality of light sources are received by, for example, the ToF sensor 23 in a time division manner (switched for each frame).

In the following description, in order to facilitate understanding, the operation of only one light source unit will be described. Note that one light source unit operates without any problem for the main point (synchronization of modulation frequencies) of the present disclosure.

As illustrated in FIG. 7, when there is no deviation between the modulation frequency $f_L$ of the light source 2 and the modulation frequency $f_S$ of the distance measuring device 3 and the object 4 is in a stationary state, the distance d between the distance measuring device 3 and the object 4 does not change. Thus, the phase $\phi$ in each frame is always constant.

Figure 8:
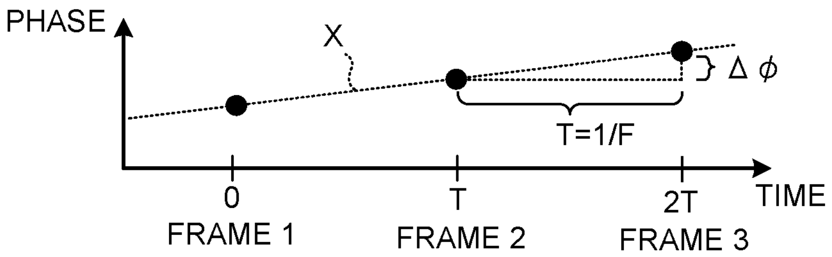
FIG. 8 is a diagram illustrating the phase change in a case where there is a deviation between the modulation frequency of the light source and the modulation frequency of the distance measuring device.

However, when there is a deviation between the modulation frequency $f_L$ of the light source 2 and the modulation frequency $f_S$ of the distance measuring device 3, the phase $\phi$ varies according to an amount of deviation between the two frequencies as illustrated in FIG. 8, even though the object 4 is in the stationary state. FIG. 8 is a diagram illustrating a change in the phase $\phi$ when there is a deviation between the modulation frequency $f_L$ of the light source 2 and the modulation frequency $f_S$ of the distance measuring device 3.

Here, in the first embodiment, a deviation amount $\Delta f$ between the modulation frequency $f_L$ and the modulation frequency $f_S$ can be calculated by the following method based on a deviation amount $\Delta\phi$ of the phase $\phi$ between adjacent frames (e.g., frame 2 and frame 3).

In a case where an interval between the adjacent frames is T (seconds), the deviation amount $\Delta\phi$ of the phase difference $\phi$ between the adjacent frames can be calculated using the following Expression (5).

$$\Delta\phi = 2\pi(f_L - f_S)T \tag{5}$$

Here, in a case where a frame rate F is a frame rate of the ToF sensor 23, time T between the adjacent frames is T=1/F. As a result, using the above Expression (5), the estimation unit 28 can calculate the deviation amount $\Delta f$ between the modulation frequency $f_L$ and the modulation frequency $f_S$ by using the following Expression (6).

$$\Delta f = f_L - f_S = \Delta\phi \cdot F/(2\pi) \tag{6}$$

Then, using the above Expression (6), the adjustment unit 29 can adjust a new modulation frequency $f_S(N)$ of the distance measuring device 3 by using the following Expression (7).

$$f_s(N) = f_s + \Delta f = f_s + \Delta\phi \cdot F/(2\pi) \tag{7}$$

As a result, it is possible to eliminate the deviation between the modulation frequency $f_L$ of the light source 2 and the modulation frequency $f_S(N)$ of the distance measuring device 3. Thus, the distance d can be accurately calculated.

Figure 9:
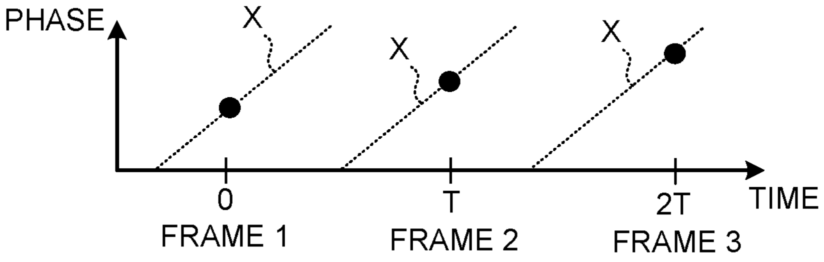
FIG. 9 is a diagram illustrating the phase change in a case where there is a large deviation between the modulation frequency of the light source and the modulation frequency of the distance measuring device.

On the other hand, the estimation process of the modulation frequency $f_L$ described so far has a problem of so-called "indefiniteness of 2π". FIG. 9 is a diagram illustrating a change in the phase difference $\phi$ when there is a large deviation between the modulation frequency $f_L$ of the light source 2 and the modulation frequency $f_S$ of the distance measuring device 3.

As illustrated in FIG. 9, even when the deviation between the modulation frequency $f_L$ of the light source 2 and the modulation frequency $f_S$ of the distance measuring device 3 is large and inclination of a broken line X indicating the change in the phase difference $\phi$ is larger than that of the example in FIG. 8, a value of the phase difference $\phi$ in each frame may be the same as that of the example in FIG. 8.

This is because, since the value of the phase $\phi$ observed by the distance measuring device 3 is in a range from 0 to 2π, it cannot be distinguished from the value before one cycle when the value of the phase $\phi$ returns from 2π to 0 after one cycle.

For example, in a case where the frame rate F of the ToF sensor 23 is 30 (fps), in the above method, the deviation amount $\Delta f$ between the modulation frequency $f_L$ of the light source 2 and the modulation frequency $f_S$ of the distance measuring device 3 cannot be distinguished between $\Delta f$ (Hz), $\Delta f \pm 30$ (Hz), $\Delta f \pm 60$ (Hz), and so on.

Therefore, in the first embodiment, even when there is the "indefiniteness of 2π", the deviation amount $\Delta f$ between the modulation frequency $f_L$ of the light source 2 and the modulation frequency $f_S$ of the distance measuring device 3 is accurately obtained.

Figure 10:
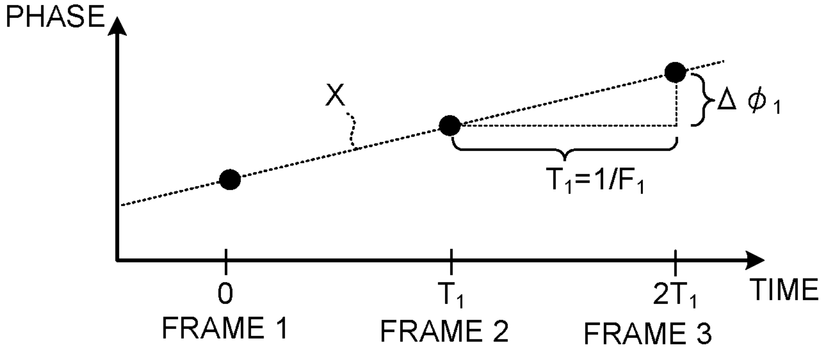
FIG. 10 is a diagram illustrating a first photographing process according to the first embodiment of the present disclosure.

FIG. 10 is a diagram illustrating a first photographing process according to the first embodiment of the present disclosure. In the first embodiment, first, the control unit 30 sets the operation mode of the distance measuring device 3 in accordance with the operation mode of the light source 2 communicated in advance by the communication unit 31. Specifically, the operation modes are set such that the frame rates of the light source 2 and the distance measuring device 3 become a predetermined frame rate $F_1$.

Note that the operation mode may be set by adjusting driving of the ToF sensor 23 using the setting of the light source 2 as a master, as described above, or may be set by another method. For example, the setting of the distance measuring device 3 may be used as the master, and the operation mode of the distance measuring device 3 may be set using the light source 2 as a slave.

In addition, the operation mode of the distance measuring device 3 may be set by switching the operation modes of both the light source 2 and the distance measuring device 3 at predetermined time. Note that, in this case, communication between the light source 2 and the distance measuring device 3 becomes unnecessary.

Next, in the distance measuring device 3 set to a predetermined operation mode, the ToF sensor 23 captures the object 4 to acquire image data. Then, the phase calculation unit 24 calculates the phase $\phi$ of the image data acquired for each frame.

Next, the estimation unit 28 calculates a deviation amount $\Delta\phi_1$ of the phase $\phi$ between the adjacent frames, and then calculates a frequency deviation amount $\Delta f_1$ from the deviation amount $\Delta\phi_1$, using the following Expression (8).

$$\Delta f_1 = \Delta\phi_1 \cdot F_1/(2\pi) \tag{8}$$

Here, when a true deviation amount $\Delta f_{GT}$ is a true deviation amount between the modulation frequency $f_L$ of the light source 2 and the modulation frequency $f_S$ of the distance measuring device 3, a value of the true deviation amount $\Delta f_{GT}$ is expressed by the following Expression (9) from the "indefiniteness of 2π".

$$\Delta f_{GT} = \Delta f_1 + N_1 \cdot F_1 \tag{9}$$

($N_1$: Integer)

Figure 11:
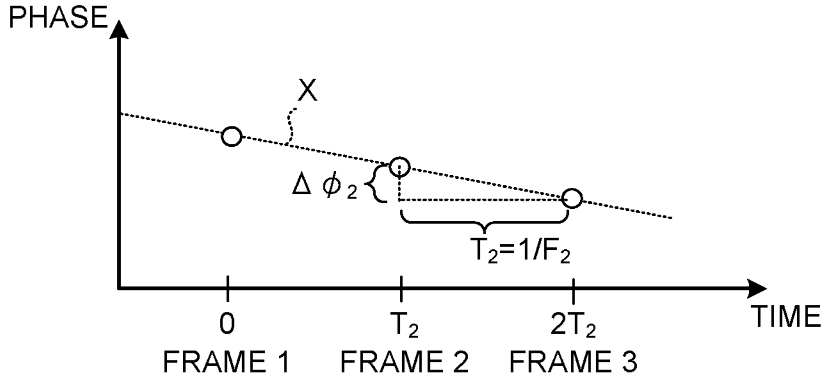
FIG. 11 is a diagram illustrating a second photographing process according to the first embodiment of the present disclosure.

FIG. 11 is a diagram illustrating a second photographing process according to the first embodiment of the present disclosure. Subsequently, the control unit 30 and the control unit 15 switch the operation modes of the light source 2 and the distance measuring device 3 from the operation modes for the first photographing process. Specifically, the control unit 30 and the control unit 15 switch the operation modes such that the frame rates of the light source 2 and the distance measuring device 3 become a predetermined frame rate $F_2$.

Next, in the distance measuring device 3 whose operation mode has been switched, the ToF sensor 23 captures the object 4 to acquire image data. Then, the phase calculation unit 24 calculates the phase $\phi$ of the image data acquired for each frame.

Next, the estimation unit 28 calculates a deviation amount $\Delta\phi_2$ of the phase $\phi$ between the adjacent frames, and then calculates a frequency deviation amount $\Delta f_2$ from the deviation amount $\Delta\phi_2$, using the following Expression (10).

$$\Delta f_2 = \Delta\phi_2 \cdot F_2/(2\pi) \tag{10}$$

Here, the value of the true deviation amount $\Delta f_{GT}$ between the modulation frequency $f_L$ of the light source 2 and the modulation frequency $f_S$ of the distance measuring device 3 is expressed by the following Expression (11) from the "indefiniteness of 2π".

$$\Delta f_{GT} = \Delta f_2 + N_2 \cdot F_2 \tag{11}$$

($N_2$: Integer)

Next, in the first embodiment, the true deviation amount $\Delta f_{GT}$ is obtained by obtaining the integer $N_1$ in the above Expression (9) and the integer $N_2$ in the Expression (11). In the first embodiment, for example, the integer $N_1$ and the integer $N_2$ can be obtained by using a method known as the "Chinese remainder theorem". Next, an example using this method will be described.

A least common multiple A is a least common multiple of the frame rate $F_1$ in the first photographing process and the frame rate $F_2$ in the second photographing process. Then, the estimation unit 28 calculates a value $A_1$ and a value $A_2$ from the following Expressions (12) and (13), using the least common multiple A.

$$A_1 = A/F_1 \tag{12}$$

$$A_2 = A/F_2 \tag{13}$$

Note that the frame rates $F_1$ and $F_2$ are selected such that the least common multiple A does not coincide with the frame rates $F_1$ and $F_2$.

Next, the estimation unit 28 calculates a value e from the following Expression (14), using the deviation amount $\Delta f_1$ calculated by the above Expression (8) and the deviation amount $\Delta f_2$ calculated by the Expression (10).

$$e = A \cdot (\Delta f_1 - \Delta f_2)/(F_1 \cdot F_2) \tag{14}$$

Here, the following Expression (15) is established from Expressions (9) and (11):

$$\Delta f_{GT} = \Delta f_1 + N_1 \cdot F_1 = \Delta f_2 + N_2 \cdot F_2 \tag{15}$$

The following Expression (16) is established from the Expression (15).

$$\Delta f_1 - \Delta f_2 = N_2 \cdot F_2 - N_1 \cdot F_1 \tag{16}$$

Therefore, the following Expression (17) is established from the above Expressions (12) to (14) and (16).

$$e = A \cdot (N_2 \cdot F_1 - N_1 \cdot F_2) = N_2 \cdot A_1 - N_1 \cdot A_2 \tag{17}$$

Next, the estimation unit 28 obtains in advance a value b that satisfies the following Expression (18).

$$(b \cdot A_1) \bmod A_2 = 1 \tag{18}$$

Then, the estimation unit 28 calculates an integer $N_2'$ as in the following Expressions (19) and (20). Note that, for calculation, the integer $N_2'$ is used as the integer $N_2$, and $0 \le N_2' < A_2$ is satisfied.

$$(b \cdot e) \bmod A_2 = b \cdot (N_2' \cdot A_1 - N_1 \cdot A_2) \bmod A_2 = (N_2' \bmod A_2) \times (b \cdot A_1 \bmod A_2) - (b \cdot N_1 \cdot A_2 \bmod A_2) = N_2' \tag{19}$$

$$\text{(2) When } e < 0 - [b \cdot |e| \bmod A_2] = N_2' \tag{20}$$

Then, the estimation unit 28 calculates the integer $N_2$ as in the following expressions (21) to (23).

(1)

$$\text{when } -A_2/2 \le N_2' \le A_2/2 \quad N_2 = N_2' \tag{21}$$

(2)

$$\text{when } A_2/2 < N_2' \le A_2 \quad N_2 = N_2' - A_2 \tag{22}$$

(3)

$$\text{when } -A_2 < N_2' < -A_2/2 \quad N_2 = N_2' + A_2 \tag{23}$$

Finally, the estimation unit 28 can calculate the true deviation amount $\Delta f_{GT}$ between the modulation frequency $f_L$ of the light source 2 and the modulation frequency $f_S$ of the distance measuring device 3 from the following Expression (24), using the integer $N_2$ calculated as described above.

$$\Delta f_{GT} = N_2 \cdot F_2 + \Delta f_2 \tag{24}$$

Note that the estimation unit 28 can verify whether or not the true deviation amount $\Delta f_{GT}$ is correctly calculated by replacing various numerical values of the first photographing process and the second photographing process and applying the method described in the above Expressions (12) to (24) again.

Then, the adjustment unit 29 can adjust, using the above Expression (24), a new modulation frequency $f_S(N)$ of the distance measuring device 3 as in the following Expression (25).

$$f_S(N) = f_S + \Delta f_{GT} \tag{25}$$

As a result, it is possible to eliminate the deviation between the modulation frequency $f_L$ of the light source 2 and the modulation frequency $f_S(N)$ of the distance measuring device 3. Thus, the distance d can be accurately calculated. For example, the adjustment unit 29 can adjust the modulation frequency $f_S$ of the distance measuring device 3 to the modulation frequency $f_S(N)$ by adjusting the value of the PLL coefficient $C_S$ of the PLL circuit 22.

In the first embodiment, by calculating the true deviation amount $\Delta f_{GT}$ by applying the above method, an estimation range of the true deviation amount $\Delta f_{GT}$ can be set to a range of $-A/2\ (\text{Hz}) < \Delta f_{GT} < A/2\ (\text{Hz})$.

For example, when the frame rate $F_1$ is 30 (fps) and the frame rate $F_2$ is 40 (fps), the least common multiple A is 120, so that the estimation range of the true deviation amount $\Delta f_{GT}$ can be set to a range of $-60\ (\text{Hz}) < \Delta f_{GT} < +60\ (\text{Hz})$.

On the other hand, when the above method is not applied, the estimation range of the deviation amount $\Delta f$ is in a range of $-F/2\ (\text{Hz}) < \Delta f_{GT} < F/2\ (\text{Hz})$. In other words, when the frame rate F is 30 (fps), the estimation range of the deviation amount $\Delta f$ is in a range of $-15\ (\text{Hz}) < \Delta f_{GT} < +15\ (\text{Hz})$.

As described above, in the first embodiment, by calculating the true deviation amount $\Delta f_{GT}$ by applying the above method, the estimation range of the true deviation amount $\Delta f_{GT}$ can be expanded. Therefore, according to the first embodiment, even when the modulation frequency $f_L$ of the light source 2 and the modulation frequency $f_S$ of the distance measuring device 3 are greatly deviated, the modulation frequency $f_S$ of the distance measuring device 3 can be matched with the modulation frequency $f_L$ of the light source 2.

As described above, in the first embodiment, the modulation frequency $f_L$ (i.e., the true deviation amount $\Delta f_{GT}$) of the light source 2 is estimated based on the plurality of pieces of image data captured while the frame rate is switched between the frame rates $F_1$ and $F_2$ by the control unit 30. As a result, the modulation frequency $f_S$ of the ToF sensor 23 (i.e., the distance measuring device 3) can be matched with the modulation frequency $f_L$ of the light source 2.

Figure 12:
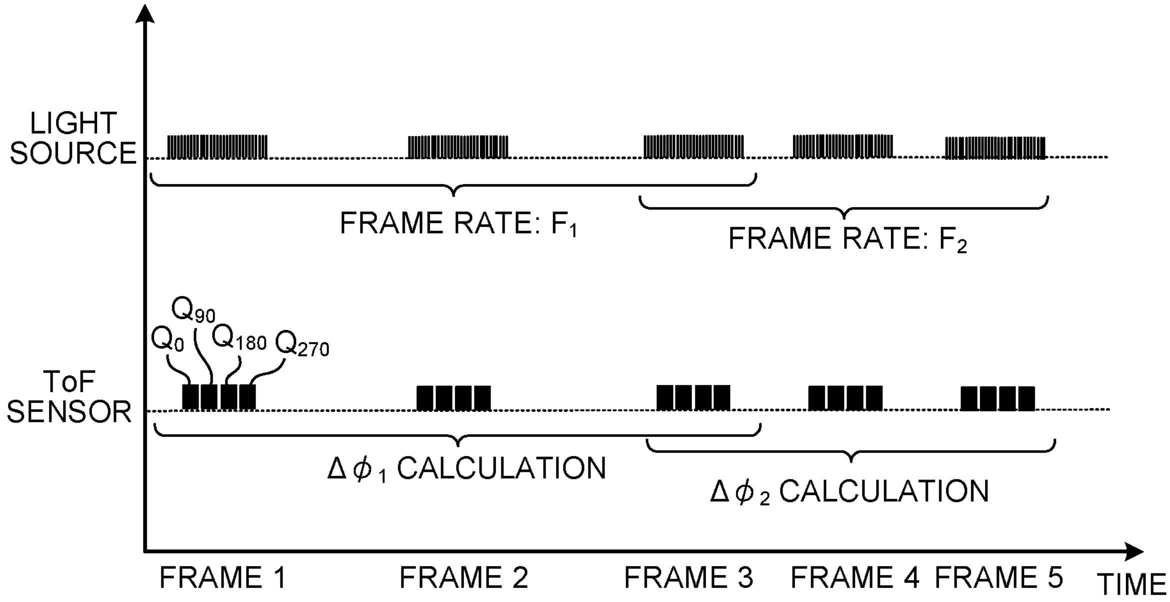
FIG. 12 is a diagram illustrating an example of an operation in an estimation process of the distance measuring system according to the first embodiment of the present disclosure.

FIG. 12 is a diagram illustrating an example of an operation in the estimation process of the distance measuring system 1 according to the first embodiment of the present disclosure. In the example in FIG. 12, the control unit 30 and the control unit 15 switch both operation modes of the light source 2 and the ToF sensor 23 of the distance measuring device 3.

First, the control unit 30 and the control unit 15 perform the first photographing process. Specifically, as illustrated in FIG. 12, the control unit 30 and the control unit 15 operate the light source 2 and the ToF sensor 23 to be synchronously turned on/off at the same frame rate $F_1$ (e.g., 30 (fps)).

Note that the control unit 30 sets the operation mode of the distance measuring device 3 in accordance with the operation mode of the light source 2 communicated in advance by the communication unit 31. Furthermore, the control unit 30 and the control unit 15 can accurately synchronize the light source 2 and the ToF sensor 23 by using a precision time protocol (PTP) technology.

Next, the ToF sensor 23 acquires data of the plurality of components $Q_0$, $Q_{90}$, $Q_{180}$, and $Q_{270}$ for each frame. Then, the phase calculation unit 24 calculates the phase $\phi$ for each frame based on the data of the plurality of components $Q_0$, $Q_{90}$, $Q_{180}$, and $Q_{270}$.

Next, the estimation unit 28 calculates the deviation amount $\Delta\phi_1$ of the phase $\phi$ between the adjacent frames at the frame rate $F_1$.

Subsequently, the control unit 30 and the control unit 15 perform the second photographing process. Specifically, the control unit 30 and the control unit 15 switch the operation mode such that the light source 2 and the ToF sensor 23 are synchronously turned on/off at the frame rate $F_2$ (e.g., 40 (fps)) different from the frame rate $F_1$.

Note that the control unit 30 switches the operation mode of the distance measuring device 3 in accordance with the operation mode of the light source 2 communicated in advance by the communication unit 31.

Next, the ToF sensor 23 acquires data of the plurality of components $Q_0$, $Q_{90}$, $Q_{180}$, and $Q_{270}$ for each frame. Then, the phase calculation unit 24 calculates the phase $\phi$ for each frame based on the data of the plurality of components $Q_0$, $Q_{90}$, $Q_{180}$, and $Q_{270}$.

Next, the estimation unit 28 calculates difference (deviation amount) $\Delta\phi_2$ of the phase $\phi$ between the adjacent frames at the frame rate $F_2$. Note that, since the subsequent process is described above, description thereof is omitted.

In the example in FIG. 12, by switching both the operation modes of the light source 2 and the ToF sensor 23, the light emission time of the light source 2 can be minimized. Therefore, according to the example in FIG. 12, power consumption of the distance measuring system 1 can be reduced.

Figure 13:
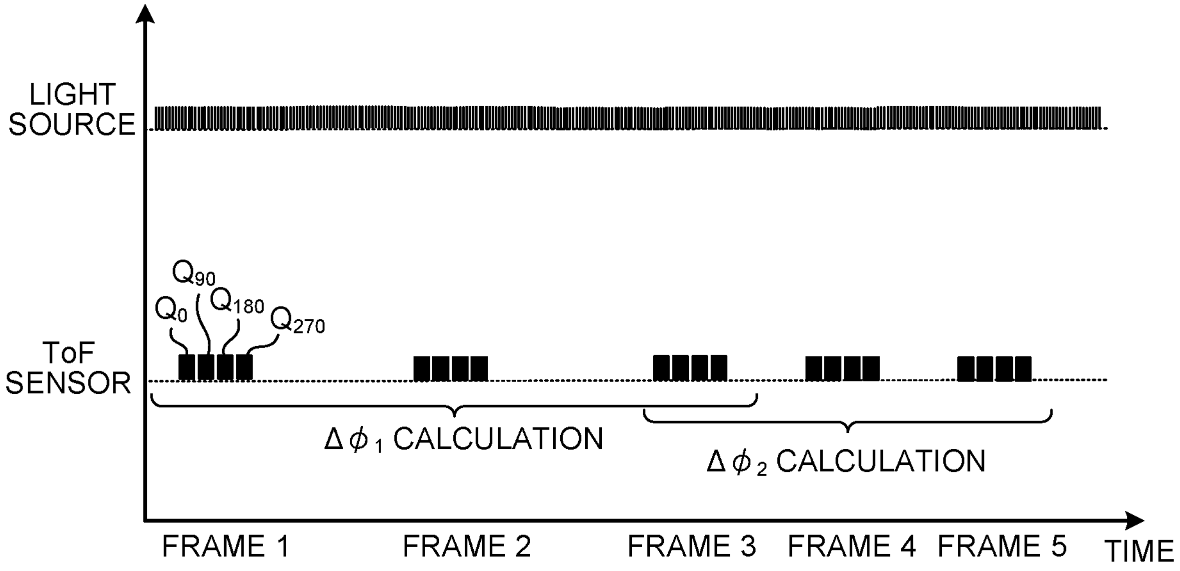
FIG. 13 is a diagram illustrating another example of the operation in the estimation process of the distance measuring system according to the first embodiment of the present disclosure.

FIG. 13 is a diagram illustrating another example of the operation in the estimation process of the distance measuring system 1 according to the first embodiment of the present disclosure. In the example in FIG. 13, the control unit 30 switches only the operation mode of the ToF sensor 23 of the distance measuring device 3.

First, the control unit 30 performs the first photographing process. Specifically, as illustrated in FIG. 13, the control unit 30 operates the ToF sensor 23 to be turned ON/OFF at the predetermined frame rate $F_1$ (for example, 30 (fps)). Note that, in the example in FIG. 13, the light source 2 is controlled to continuously emit the emission light L1.

Next, the ToF sensor 23 acquires data of the plurality of components $Q_0$, $Q_{90}$, $Q_{180}$, and $Q_{270}$ for each frame. Then, the phase calculation unit 24 calculates the phase $\phi$ for each frame based on the data of the plurality of components $Q_0$, $Q_{90}$, $Q_{180}$, and $Q_{270}$.

Next, the estimation unit 28 calculates the deviation amount $\Delta\phi_1$ of the phase $\phi$ between the adjacent frames at the frame rate $F_1$.

Subsequently, the control unit 30 performs the second photographing process. Specifically, the control unit 30 switches the operation mode so as to turn ON/OFF the ToF sensor 23 at the frame rate $F_2$ (e.g., 40 (fps)) different from the frame rate $F_1$.

Next, the ToF sensor 23 acquires data of the plurality of components $Q_0$, $Q_{90}$, $Q_{180}$, and $Q_{270}$ for each frame. Then, the phase calculation unit 24 calculates the phase $\phi$ for each frame based on the data of the plurality of components $Q_0$, $Q_{90}$, $Q_{180}$, and $Q_{270}$.

Next, the estimation unit 28 calculates the deviation amount $\Delta\phi_2$ of the phase $\phi$ between the adjacent frames at the frame rate $F_2$. Note that, since the subsequent process is described above, description thereof is omitted.

In the example in FIG. 13, by switching only the operation mode of the ToF sensor 23, the modulation frequency $f_L$ of the light source 2 can be estimated even in a case where the communication unit 16 is not provided in the light source 2. Therefore, according to the example in FIG. 13, since the communication unit 16 can be omitted from the light source 2, a cost of the distance measuring system 1 can be reduced.

Note that, in the first embodiment described so far gives the example in which the light source 2 and the ToF sensor 23 are switched to two operation modes, but the number of operation modes to be switched to is not limited to two. The operation may be switched to three or more operation modes.

Furthermore, the first embodiment described above gives the example in which the modulation frequency $f_S$ of the distance measuring device 3 is adjusted in order to match the modulation frequency $f_S$ of the distance measuring device 3 with the modulation frequency $f_L$ of the light source 2. However, a target to be adjusted is not limited to the modulation frequency $f_S$ of the distance measuring device 3.

For example, in order to match the modulation frequency $f_S$ of the distance measuring device 3 with the modulation frequency $f_L$ of the light source 2, the adjustment unit 29 may adjust the modulation frequency $f_L$ of the light source 2. In addition, in order to match the modulation frequency $f_S$ of the distance measuring device 3 with the modulation frequency $f_L$ of the light source 2, the adjustment unit 29 may adjust both the modulation frequency $f_L$ of the light source 2 and the modulation frequency $f_S$ of the distance measuring device 3.

Furthermore, as described above, in order to adjust the modulation frequency $f_L$ of the light source 2, the adjustment unit 29 may send to the control unit 15 a command for controlling the PLL coefficient $C_L$ of the PLL circuit 12 via the communication unit 31 and the communication unit 16.

Second Embodiment

The first embodiment described so far gives the example of switching the frame rates F of the light source 2 and the distance measuring device 3. However, the operation mode to be switched is not limited to the frame rate F. Next, as a second embodiment, an example of switching modulation frequencies $f_L$ and $f_S$ of the light source 2 and the distance measuring device 3 will be described with reference to FIG. 14 to FIG. 17.

Figure 14:
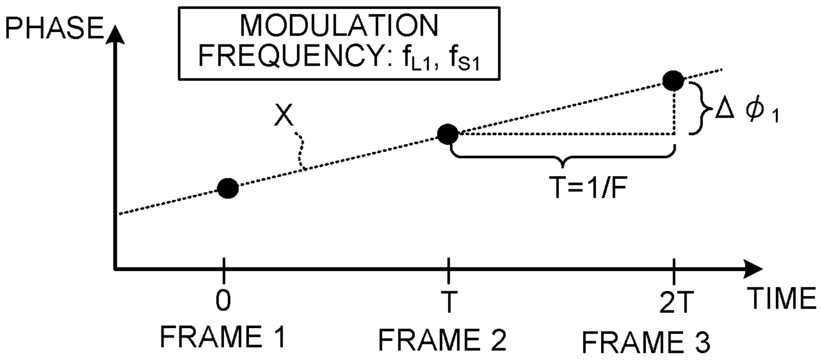
FIG. 14 is a diagram illustrating a first photographing process according to a second embodiment of the present disclosure.

FIG. 14 is a diagram illustrating a first photographing process according to the second embodiment of the present disclosure. In the second embodiment, first, the control unit 30 and the control unit 15 set operation modes, so that the modulation frequencies of the light source 2 and the distance measuring device 3 become predetermined modulation frequencies $f_{L1}$ and $f_{S1}$.

Specifically, the control unit 30 changes the PLL coefficient of the PLL circuit 22 to $C_{S1}$ so as to match the PLL coefficient $C_{L1}$ of the PLL circuit 12, thereby setting the operation mode so that the modulation frequency $f_{S1}$ of the distance measuring device 3 matches the modulation frequency $f_{L1}$ of the light source 2. Note that the modulation frequencies $f_{L1}$ and $f_{S1}$ are frequencies considered to be equal to each other. In the second embodiment, the frame rate is constant at F.

Next, in the distance measuring device 3 set to a predetermined operation mode, the ToF sensor 23 captures the object 4 to acquire image data. Then, the phase calculation unit 24 calculates the phase $\phi$ of the acquired image data for each frame.

Next, the estimation unit 28 calculates the deviation amount $\Delta\phi_1$ of the phase $\phi$ between the adjacent frames, and calculates the frequency deviation amount $\Delta f_1$ from the deviation amount $\Delta\phi_1$, using the following Expression (26).

$$\Delta f_1 = \Delta\phi_1 \cdot F/(2\pi) \tag{26}$$

Here, in a case where an error $\Delta f_{Err}$ is an error between the frequency $f_{CL1}$ of the clock signal generated by the light source clock 11 and the frequency $f_{CL2}$ of the clock signal generated by the sensor clock 21, a value of the error $\Delta f_{Err}$ is expressed by the following Expression (27) from the "indefiniteness of $2\pi$".

$$\Delta f_{Err} = (\Delta f_1 + N_1 \cdot F)/C_{S1} \tag{27}$$

$(N_1\text{: Integer})$

Figure 15:
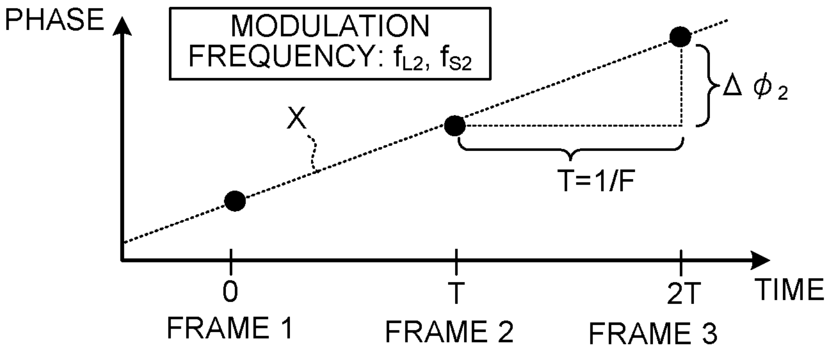
FIG. 15 is a diagram illustrating a second photographing process according to the second embodiment of the present disclosure.

FIG. 15 is a diagram illustrating a second photographing process according to the second embodiment of the present disclosure. Subsequently, the control unit 30 and the control unit 15 switch the operation modes of the light source 2 and the distance measuring device 3 from the operation modes for the first photographing process.

Specifically, the control unit 30 switches the operation mode so that the modulation frequency $f_{S2}$ of the distance measuring device 3 is matched with the modulation frequency $f_{L2}$ of the light source 2. In other words, the control unit 30 changes the PLL coefficient $C_{S2}$ of the PLL circuit 22 so that the PLL coefficient of the PLL circuit 12 matches with $C_{L2}$. The modulation frequencies $f_{L2}$ and $f_{S2}$ are frequencies considered to be equal to each other.

Next, in the distance measuring device 3 whose operation mode has been switched, the ToF sensor 23 captures the object 4 to acquire image data. Then, the phase calculation unit 24 calculates the phase $\phi$ of the acquired image data for each frame.

Next, the estimation unit 28 calculates the deviation amount $\Delta\phi_2$ of the phase $\phi$ between the adjacent frames, and then calculates a frequency deviation amount $\Delta f_2$ from the deviation amount $\Delta\phi_2$, using the following Expression (28).

$$\Delta f_2 = \Delta\phi_2 \cdot F/(2\pi) \tag{28}$$

Here, a value of the error $\Delta f_{Err}$ is expressed by the following Expression (29) from the "indefiniteness of $2\pi$".

$$\Delta f_{Err} = (\Delta f_2 + N_2 \cdot F)/C_{S2} \tag{29}$$

$(N_2\text{: Integer})$

Next, in the second embodiment, the error $\Delta f_{Err}$ is obtained by obtaining the integer $N_1$ in the above Expression (27) and the integer $N_2$ in the Expression (29). In the second embodiment, for example, the integer $N_1$ and the integer $N_2$ can be obtained by using a method known as the "Chinese remainder theorem". Next, an example using this method will be described.

The PLL coefficient $C_{S1}$ of the PLL circuit 12 in the first photographing process and the PLL coefficient $C_{S2}$ of the PLL circuit 12 in the second photographing process set the value $C_{S1}$ and the value $C_{S2}$ such that $C_{S1} \cdot f_{CL1}$ and $C_{S2} \cdot f_{CL1}$ are not mutually dividable. C is set such that a value $A_1$ and a value $A_2$ of the following Expressions (30) and (31) are values that are prime to each other.

$$A_1 = C/C_{S1} \tag{30}$$

$$A_2 = C/C_{S2} \tag{31}$$

Next, the estimation unit 28 calculates the value e from the following Expression (32), using the deviation amount $\Delta f_1$ calculated by the above Expression (26) and the deviation amount $\Delta f_2$ calculated by the Expression (28).

$$e = (C/C_{S1} \cdot C_{S2} \cdot F)) \cdot (C_{S2} \cdot \Delta f_1 - C_{S1} \cdot \Delta f_2) \tag{32}$$

Here, the following Expression (33) is established from Expressions (26) and (28).

$$\Delta f_{Err} = (\Delta f_1 + N_1 \cdot F)/C_{S1} = (\Delta f_2 + N_2 \cdot F)/C_{S2} \tag{33}$$

The following Expression (34) is established from Expression (33).

$$C_{S2} \cdot \Delta f_1 - C_{S1} \cdot \Delta f_2 = (C_{S1} \cdot N_2 - C_{S2} \cdot N_1) \cdot F \tag{34}$$

Therefore, the following Expression (35) is established from the above Expressions (30) to (32) and (34).

$$e = (C/(C_{S1} \cdot C_{S2})) \cdot (C_{S1} \cdot N_2 - C_{S2} \cdot N_1) = N_2 \cdot A_2 - N_1 \cdot A_1 \tag{35}$$

Next, the estimation unit 28 obtains in advance the value b that satisfies the following Expression (36).

$$(b \cdot A_2) \bmod A_1 = 1 \tag{36}$$

Then, the estimation unit 28 calculates an integer $N_2'$ as in the following Expressions (37) and (38). Note that, for calculation, the integer $N_2'$ is used as the integer $N_2$, and $0 \le N_2' < A_1$ is satisfied.

(1) When $e \ge 0$ $$(b \cdot e) \bmod A_1 = b \cdot (N_2' \cdot A_2 - N_1 \cdot A_1) \bmod A_1 = (N_2' \bmod A_1) \times (b \cdot A_2 \bmod A_1) - (b \cdot N_1 \cdot A_2 \bmod A_1) = N_2' \tag{37}$$

Then, the estimation unit 28 calculates the integer $N_2$ as in the following Expressions (39) to (41).

(1) When $-A_1/2 \le N_2' \le A_1/2$ $$N_2 = N_2' \tag{39}$$

(2) When $A_1/2 < N_2' \le A_1$ $$N_2 = N_2' - A_1 \tag{40}$$

(3) When $-A_1 < N_2' < -A_1/2$ $$N_2 = N_2' + A_1 \tag{41}$$

Finally, the estimation unit 28 can calculate the error $\Delta f_{Err}$ between the frequency $f_{CL1}$ of the clock signal generated by the light source clock 11 and the frequency $f_{CL2}$ of the clock signal generated by the sensor clock 21 from the following Expression (42), using the integer $N_2$ calculated as described above.

$$\Delta f_{Err} = (\Delta f_2 + N_2 \cdot F)/C_{S2} \tag{42}$$

Note that the estimation unit 28 can verify whether or not the error $\Delta f_{Err}$ is correctly calculated by replacing various numerical values of the first photographing process and the second photographing process and applying the method described in the above Expressions (26) to (42) again.

Then, the adjustment unit 29 can adjust a new modulation frequency $f_S(N)$ of the distance measuring device 3 based on the error $\Delta f_{Err}$ calculated by the above Expression (42). As a result, it is possible to eliminate the deviation between the modulation frequency $f_L$ of the light source 2 and the modulation frequency $f_S(N)$ of the distance measuring device 3. Thus, the distance d can be accurately calculated.

For example, the adjustment unit 29 can adjust the modulation frequency $f_S$ of the distance measuring device 3 to the modulation frequency $f_S(N)$ by adjusting the PLL coefficient $C_S$ of the PLL circuit 22.

In the second embodiment, by calculating the error $\Delta f_{Err}$ by applying the above method, an estimation range of the error $\Delta f_{Err}$ can be set to a range of $-F/2A$ (Hz)$<\Delta f_{Err<F/}2A$ (Hz). Note that $A = C/(A_1 \cdot A_1)$.

As described above, in the second embodiment, by calculating the error $\Delta f_{Err}$ by applying the above method, the estimation range of the error $\Delta f_{Err}$ can be expanded. Therefore, according to the second embodiment, even when the modulation frequency $f_L$ of the light source 2 and the modulation frequency $f_S$ of the distance measuring device 3 are greatly deviated, the modulation frequency $f_S$ of the distance measuring device 3 can be matched with the modulation frequency $f_L$ of the light source 2.

As described above, in the second embodiment, the error $\Delta f_{Err}$ of the sensor clock 21 of the distance measuring device 3 with respect to the light source clock 11 of the light source 2 is estimated based on the plurality of pieces of image data captured by switching the modulation frequencies $f_L$ and $f_S$ by the control unit 30 and the control unit 15. As a result, the modulation frequency $f_S$ of the ToF sensor 23 (i.e., the distance measuring device 3) can be matched with the modulation frequency $f_L$ of the light source 2.

Figure 16:
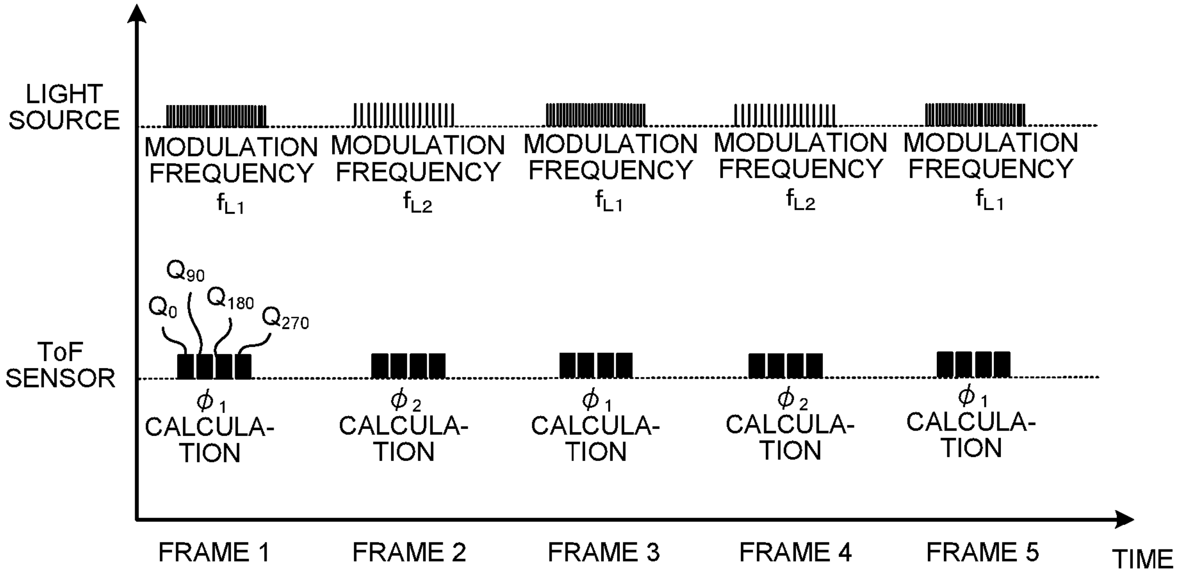
FIG. 16 is a diagram illustrating an example of an operation in an estimation process of a distance measuring system according to the second embodiment of the present disclosure.

FIG. 16 is a diagram illustrating an example of an operation in the estimation process of the distance measuring system 1 according to the second embodiment of the present disclosure. In the example in FIG. 16, the control unit 30 and the control unit 15 alternately switch the modulation frequencies $f_L$ and $f_S$ of the light source 2 and the ToF sensor 23 for each frame.

Control unit 30 and control unit 15 perform the first photographing process in the first frame (hereinafter also referred to as a frame 1). Specifically, as illustrated in FIG. 16, the control unit 30 and the control unit 15 set the modulation frequency of the light source 2 to $f_{L1}$ and set the modulation frequency of the distance measuring device 3 (i.e., the ToF sensor 23) to $f_{S1}$ in the frame 1.

Note that the control unit 30 sets the modulation frequency of the light source 2 to $f_{L1}$ by sending a command to the control unit 15 via the communication unit 31 and the communication unit 16.

Note that the operation modes of the light source 2 and the distance measuring device 3 may be set with the setting of the light source 2 as a master, and the distance measuring device 3 as a slave. In addition, the modulation frequency $f_{L1}$ may be set to the light source 2 and the modulation frequency $f_{S1}$ may be set to the distance measuring device 3 by switching the operation modes of both the light source 2 and the distance measuring device 3 at predetermined time.

Next, the ToF sensor 23 acquires data of the plurality of components $Q_0$, $Q_{90}$, $Q_{180}$, and $Q_{270}$ in the frame 1. Then, the phase calculation unit 24 calculates the phase $\phi$ of the frame 1 based on the data of the plurality of components $Q_0$, $Q_{90}$, $Q_{180}$, and $Q_{270}$.

Subsequently, the control unit 30 and the control unit 15 perform the second photographing process in the next frame (hereinafter also referred to as a frame 2). Specifically, as illustrated in FIG. 16, the control unit 30 and the control unit 15 set the modulation frequency of the light source 2 to $f_{L2}$ and set the modulation frequency of the distance measuring device 3 (i.e., the ToF sensor 23) to $f_{S2}$ in the frame 2.

Next, the ToF sensor 23 acquires data of the plurality of components $Q_0$, $Q_{90}$, $Q_{180}$, and $Q_{270}$ in the frame 2. Then, the phase calculation unit 24 calculates the phase $\phi$ of the frame 2 based on the data of the plurality of components $Q_0$, $Q_{90}$, $Q_{180}$, and $Q_{270}$.

Thereafter, similarly, the first photographing process is performed in frames 3, 5, 7, and so on, and the second photographing process is performed in frames 4, 6, 8, and so on.

Then, the estimation unit 28 calculates the deviation amount $\Delta\phi_1$ of the phase $\phi$ at the modulation frequencies $f_{L1}$ and $f_{S1}$ from the phase $\phi$ acquired in the first photographing process (frames 1, 3, 5, and so on). Furthermore, the estimation unit 28 calculates the deviation amount $\Delta\phi_2$ of the phase $\phi$ at the modulation frequencies $f_{L2}$ and $f_{S2}$ from the phase $\phi$ acquired in the second photographing process (frames 2, 4, 6, and so on). Note that, since the subsequent process is described above, description thereof is omitted.

In the example in FIG. 16, the above-described error $\Delta f_{Err}$ can be calculated by alternately switching the modulation frequencies $f_L$ and $f_S$ of the light source 2 and the ToF sensor 23.

Figure 17:
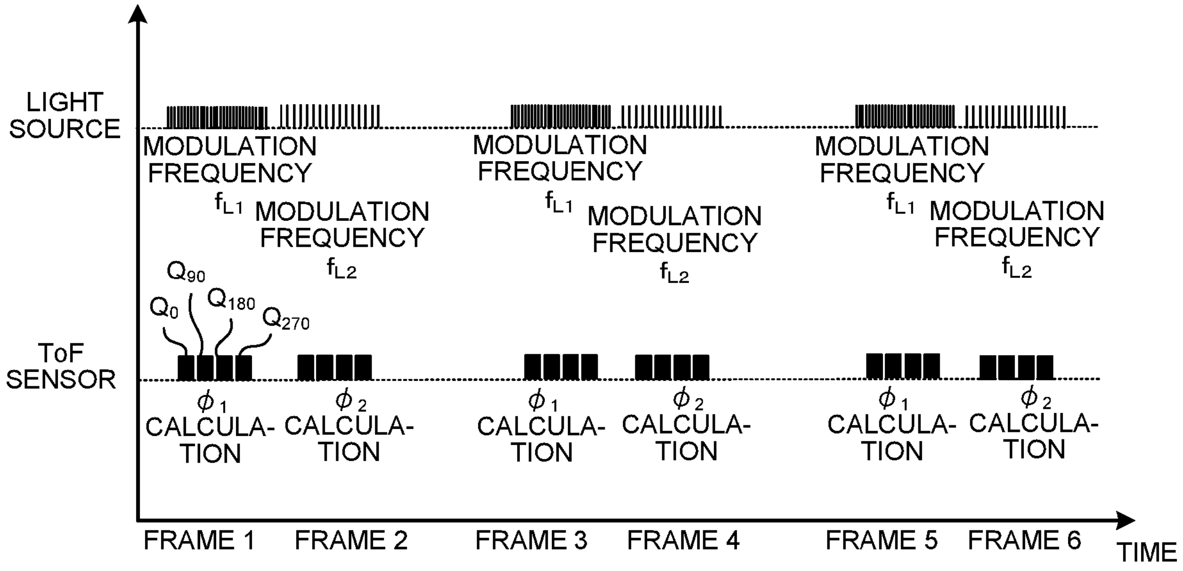
FIG. 17 is a diagram illustrating another example of the operation in the estimation process of the distance measuring system according to the second embodiment of the present disclosure.

FIG. 17 is a diagram illustrating another example of the operation in the estimation process of the distance measuring system 1 according to the second embodiment of the present disclosure. In the example in FIG. 17, an interval between the frame (e.g., frame 1) in which the first photographing process is performed and the frame (e.g., frame 2) of the second photographing process performed subsequently to the first photographing process is made as short as possible.

As a result, even when the object 4 slightly moves, the value of the distance d of the object 4 in the first photographing process and the value of the distance d of the object 4 in the second photographing process to be subsequently performed can be brought close to each other. Therefore, according to the example in FIG. 17, even when the object 4 slightly moves, the error $\Delta f_{Err}$ can be calculated satisfactorily.

Note that the second embodiment described so far gives the example in which the light source 2 and the ToF sensor 23 are switched to two operation modes, but the number of operation modes to be switched to is not limited to two. The operation may be switched to three or more operation modes.

Furthermore, the second embodiment described above gives the example in which the modulation frequency $f_S$ of the distance measuring device 3 is adjusted in order to match the modulation frequency $f_S$ of the distance measuring device 3 with the modulation frequency $f_L$ of the light source 2. However, a target to be adjusted is not limited to the modulation frequency $f_S$ of the distance measuring device 3.

For example, in order to match the modulation frequency $f_S$ of the distance measuring device 3 with the modulation frequency $f_L$ of the light source 2, the adjustment unit 29 may adjust the modulation frequency $f_L$ of the light source 2. In addition, in order to match the modulation frequency $f_S$ of the distance measuring device 3 with the modulation frequency $f_L$ of the light source 2, the adjustment unit 29 may adjust both the modulation frequency $f_L$ of the light source 2 and the modulation frequency $f_S$ of the distance measuring device 3.

Third Embodiment

Figure 18:
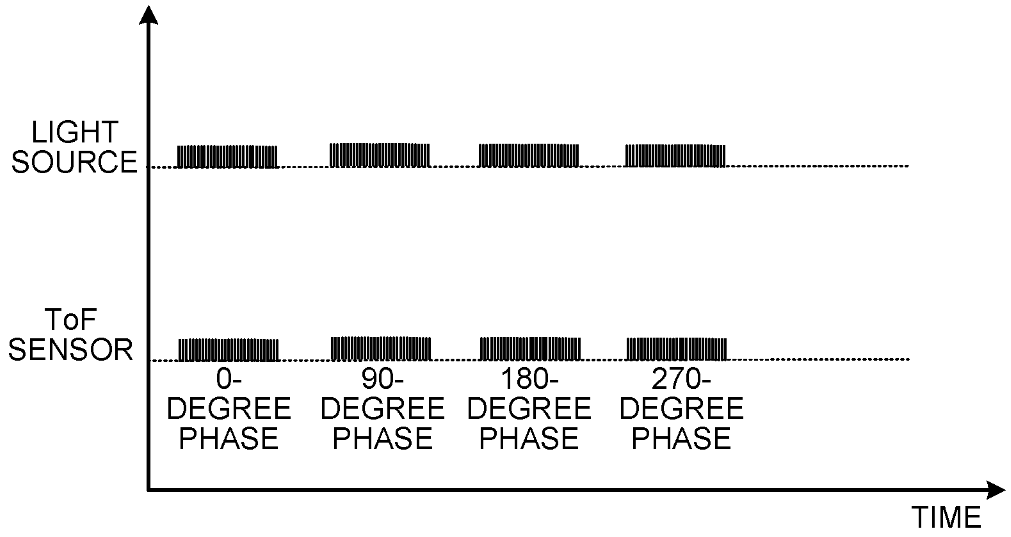
FIG. 18 is a diagram illustrating an example of an operation in an estimation process of a distance measuring system according to a third embodiment of the present disclosure.

Next, details of the estimation process of the modulation frequency $f_L$ and the adjustment process of the modulation frequency $f_S$ according to the third embodiment will be described with reference to FIG. 18. FIG. 18 is a diagram illustrating an example of an operation in the estimation process of the distance measuring system 1 according to the third embodiment of the present disclosure.

In the third embodiment, first, the deviation amount $\Delta f$ between the modulation frequency $f_L$ and the modulation frequency $f_S$ is calculated using the method described in the above Expressions (1) to (6). On the other hand, since the deviation amount $\Delta f$ calculated here has the "indefiniteness of $2\pi$", a true value of the deviation amount $\Delta f$ is expressed by the following Expression (43).

$$\Delta f(\text{true value}) = \Delta f + F \cdot N \quad (N\text{: Integer}) \tag{43}$$

Therefore, in the third embodiment, the deviation amount $\Delta f$ having the highest adequacy is regarded as the true deviation amount $\Delta f$ (true value) in consideration of the indefiniteness of $2\pi$.

Specifically, the adequacy of each deviation amount $\Delta f$ (true value) in a case where the integer N in the above Expression (43) is 0, ±1, ±2, and so on is evaluated, using a confidence value. First, the estimation unit 28 selects one value for the integer N.

Next, the control unit 30 adjusts the modulation frequency $f_S$ of the distance measuring device 3 based on the deviation amount Δf (true value) obtained by inputting the selected value for the integer N in the above Expression (43).

Next, the ToF sensor 23 acquires data of the plurality of components $Q_0$, $Q_{90}$, $Q_{180}$, and $Q_{270}$ at the adjusted modulation frequencies $f_L$ and $f_S$, as illustrated in FIG. 18. Then, the estimation unit 28 calculates the confidence value of the selected integer N, using the following Expression (44).

$$\text{Confidence value} = \left[(Q_{180} - Q_0)^2 + (Q_{90} - Q_{270})^2\right]^{1/2} \tag{44}$$

Next, the estimation unit 28 selects a value for a different integer N. Then, the control unit 30 readjusts the modulation frequency $f_S$ of the distance measuring device 3 based on the deviation amount Δf (true value) obtained by inputting the different value for the integer N in the above Expression (43).

In other words, the control unit 30 switches the operation mode of the distance measuring device 3 so that the modulation frequency $f_S$ is changed in increments of F (Hz) that is a value of the frame rate.

Then, the confidence value of the different integer N is calculated by a process similar to the above. Further, by the process similar to the above, confidence values in a case where the integer N is 0, ±1, ±2, and so on are calculated.

Next, the estimation unit 28 regards the integer N gaining the highest confidence value as the integer N with the highest adequacy. Then, the estimation unit 28 can calculate the true value of the deviation amount Δf by inputting the integer N considered to have the highest adequacy in the above Expression (43).

As described above, in the third embodiment, the deviation amount Δf between the modulation frequency $f_L$ and the modulation frequency $f_S$ can be calculated by switching the operation modes of the distance measuring device 3 and calculating the confidence value in each operation mode. As a result, the modulation frequency $f_S$ of the ToF sensor 23 (i.e., the distance measuring device 3) can be matched with the modulation frequency $f_L$ of the light source 2.

In the above description, a search is performed by changing the modulation frequency of the ToF sensor 23, but the search may be performed by changing the modulation frequency of the light source 2. In this case, the control unit 15 changes the modulation frequency $f_L$ of the light source in increments of F (Hz) that is a value of the frame rate via the communication unit 31 and the communication unit 16. As a result, the modulation frequency $f_L$ of the light source 2 can be matched with the modulation frequency $f_S$ of the ToF sensor 23 (i.e., distance measuring device 3).

Further, in the third embodiment, the modulation frequencies $f_L$ and $f_S$ are changed in increments of F (Hz) that is the value of the frame rate. For example, when the frame rate is 30 (fps), the modulation frequency $f_L$ or $f_S$ is changed in increments of 30 (Hz). As a result, useless search can be prevented.

The calculation formula of the confidence value used in the third embodiment is not limited to Expression (44). For example, the following Expression (45) or Expression (46) is also applicable as a calculation formula of the confidence value.

$$\text{Confidence value} = |Q_{180} - Q_0| + |Q_{90} - Q_{270}| \tag{45}$$

$$\text{Confidence value} = \max(|Q_0|, |Q_{90}|, |Q_{180}|, |Q_{270}|,) \tag{46}$$

Details of Estimation Process and Adjustment Process

Figure 19:
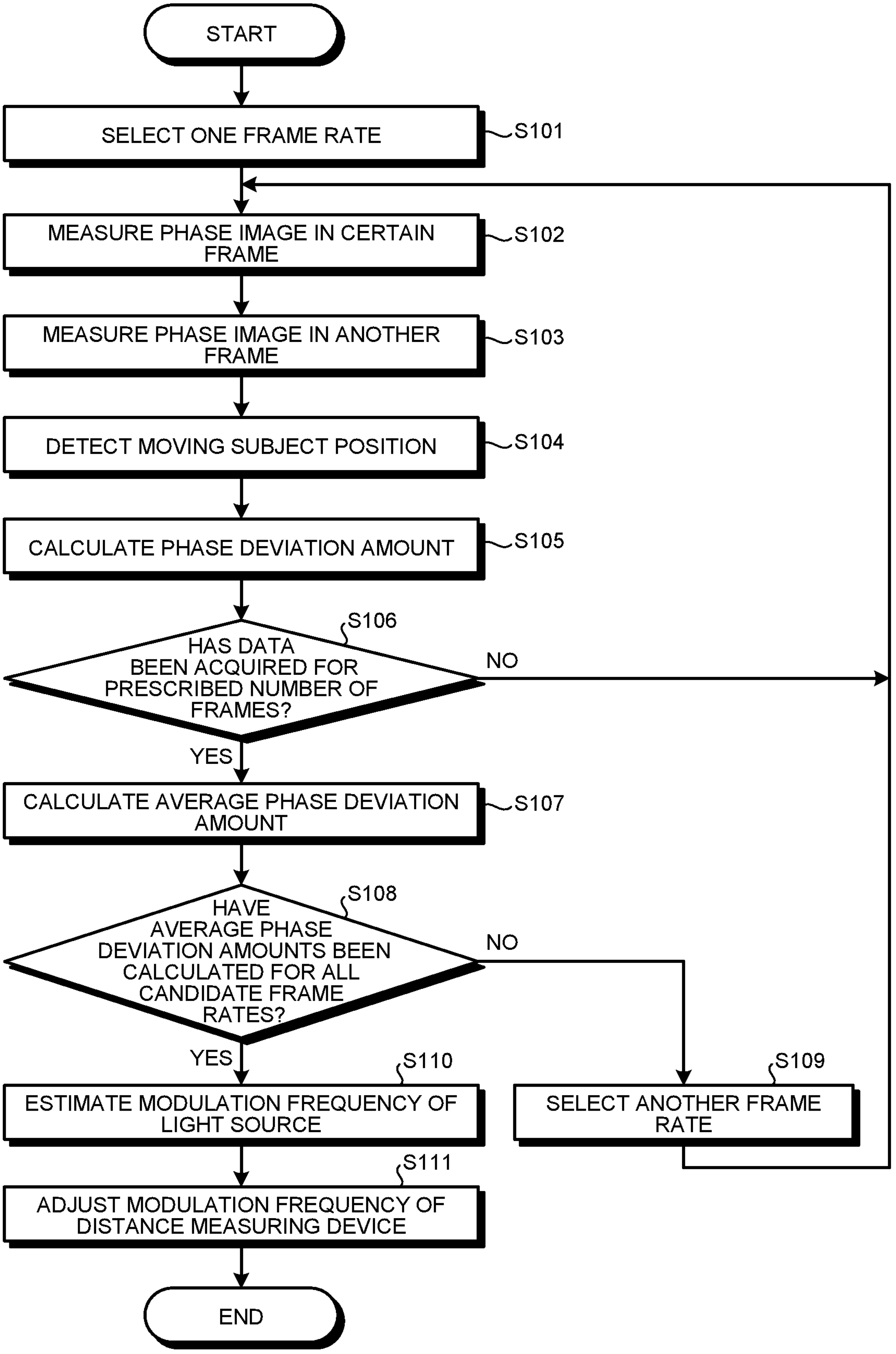
FIG. 19 is a flowchart illustrating a process procedure of the estimation process and an adjustment process according to the first embodiment of the present disclosure.

Next, details of the estimation process and the adjustment process executed by the distance measuring system 1 according to each embodiment will be described with reference to FIG. 19 to FIG. 21. FIG. 19 is a flowchart illustrating a process procedure of the estimation process and the adjustment process according to the first embodiment.

First, the control unit 30 or the control unit 15 selects one frame rate (e.g., a frame rate $F_1$) from a plurality of frame rates set in advance as candidates of a plurality of operation modes (Step S101).

Next, the ToF sensor 23 measures a phase image in a certain frame (Step S102). In other words, the ToF sensor 23 measures the components $Q_0$, $Q_{90}$, $Q_{180}$, and $Q_{270}$ in the certain frame and calculates by using Expression (4).

Next, the ToF sensor 23 measures a phase image in another frame (Step S103). In other words, the ToF sensor 23 measures the components $Q_0$, $Q_{90}$, $Q_{180}$, and $Q_{270}$ in another frame and calculates by using Expression (4).

Next, the moving subject detection unit 27 detects a moving subject position (i.e., a position of the moving subject) from the image captured by the ToF sensor 23 (Step S104).

Next, the estimation unit 28 calculates a deviation amount of the phase ϕ at the selected one frame rate based on the phase images measured in Steps S102 and S103 (Step S105).

Note that the position of the moving subject detected in Step S104 is excluded from the phase image used in Step S105. This is because it is assumed that the subject is stationary in a process of calculating the deviation amount of the phase ϕ, and thus it is difficult to accurately calculate the deviation amount of the phase ϕ when the position of the moving subject is included.

Next, the estimation unit 28 determines whether data for a prescribed number of frames has been acquired (Step S106). Then, when the data has not been acquired for the prescribed number of frames (Step S106, No), the process returns to Step S102.

On the other hand, when the data is acquired for the prescribed number of frames (Step S106, Yes), the estimation unit 28 calculates an average deviation amount of all the acquired phases (Step S107), and regards the average value as the deviation amount of the phase ϕ at the one selected frame rate.

Next, the estimation unit 28 determines whether or not the deviation amounts of the phases ϕ at all candidate frame rates have been calculated (Step S108). Then, when the deviation amounts of the phases ϕ at all candidate frame rates have not been calculated (Step S108, No), the control unit 30 or the control unit 15 selects another frame rate (e.g., frame rate $F_2$) (Step S109) and returns to the process in Step S102.

On the other hand, when the deviation amounts of the phases ϕ at all candidate frame rates have been calculated (Step S108, Yes), the estimation unit 28 estimates the modulation frequency $f_L$ of the light source 2 based on the deviation amounts of the phases $\phi$ at all candidate frame rates (Step S110).

Finally, the adjustment unit 29 adjusts the modulation frequency $f_S$ of the distance measuring device 3 based on the modulation frequency $f_L$ of the light source 2 estimated in Step S110 (Step S111), and ends the process.

Figure 20:
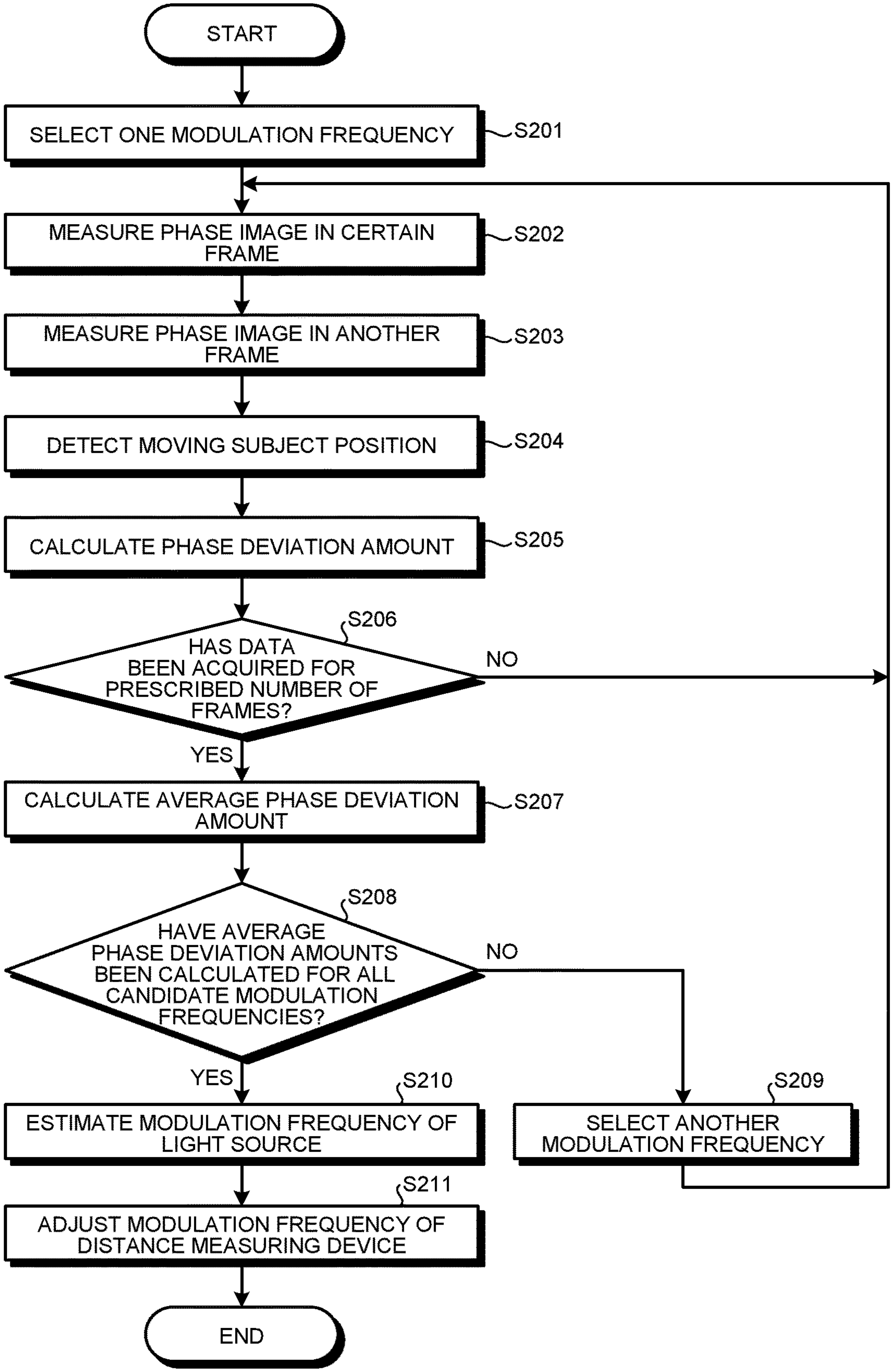
FIG. 20 is a flowchart illustrating a process procedure of the estimation process and an adjustment process according to the second embodiment of the present disclosure.

FIG. 20 is a flowchart illustrating a process procedure of the estimation process and the adjustment process according to the second embodiment.

First, the control unit 30 or the control unit 15 selects one modulation frequency (e.g., modulation frequencies $f_{L1}$, or $f_{S1}$) from a plurality of modulation frequencies set in advance as a plurality of candidate operation modes (Step S201).

Next, the ToF sensor 23 measures a phase image in a certain frame (Step S202). In other words, the ToF sensor 23 measures the components $Q_0$, $Q_{90}$, $Q_{180}$, and $Q_{270}$ in the certain frame and calculates by using Expression (4).

Next, the ToF sensor 23 measures a phase image in another frame (Step S203). In other words, the ToF sensor 23 measures the components $Q_0$, $Q_{90}$, $Q_{180}$, and $Q_{270}$ in another frame and calculates by using Expression (4).

Next, the moving subject detection unit 27 detects a moving subject position (i.e., the position of the moving subject) from the image captured by the ToF sensor 23 (Step S204).

Next, the estimation unit 28 calculates the deviation amount of the phase $\phi$ at the selected one modulation frequency based on the phase images measured in Steps S202 and S203 (Step S205). Note that the position of the moving subject detected in Step S204 is excluded from the phase image used in Step S205.

Next, the estimation unit 28 determines whether data for a prescribed number of frames has been acquired (Step S206). Then, when the data for the prescribed number of frames has not been acquired (Step S206, No), the process returns to Step S202.

On the other hand, when the data for the prescribed number of frames is acquired (Step S206, Yes), the estimation unit 28 calculates an average value of all the acquired deviation amounts of phases (Step S207), and regards the average value as the deviation amount of the phase $\phi$ in the one selected modulation frequency.

Next, the estimation unit 28 determines whether or not the deviation amount of the phase $\phi$ has been calculated for all the candidate modulation frequencies (Step S208). Then, when the deviation amounts of the phases $\phi$ for all the candidate modulation frequencies have not been calculated (Step S208, No), the control unit 30 or the control unit 15 selects another modulation frequency (e.g., modulation frequency $f_{L2}$ or $f_{S2}$) (Step S209), and returns to the process in Step S202.

On the other hand, when the deviation amounts of the phases $\phi$ for all the candidate modulation frequencies are calculated (Step S208, Yes), the estimation unit 28 estimates the modulation frequency $f_L$ of the light source 2 based on the deviation amounts of the phases $\phi$ for all the candidate modulation frequencies (Step S210).

Finally, the adjustment unit 29 adjusts the modulation frequency $f_S$ of the distance measuring device 3 based on the modulation frequency $f_L$ of the light source 2 estimated in Step S210 (Step S211), and ends the process.

Figure 21:
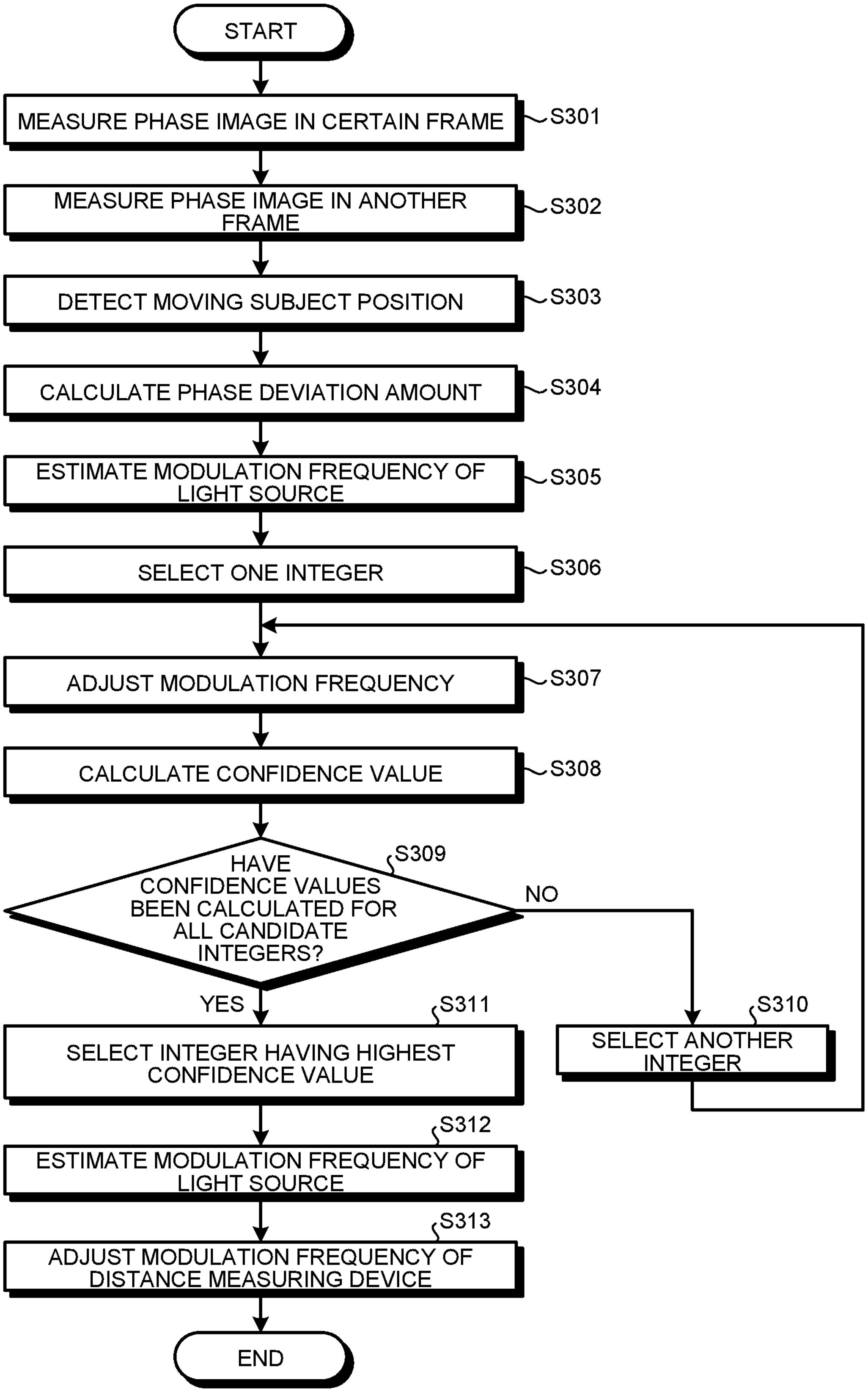
FIG. 21 is a flowchart illustrating a process procedure of the estimation process and an adjustment process according to the third embodiment of the present disclosure.

FIG. 21 is a flowchart illustrating a process procedure of the estimation process and the adjustment process according to the third embodiment.

First, the ToF sensor 23 measures a phase image in a certain frame (Step S301). In other words, the ToF sensor 23 measures the components $Q_0$, $Q_{90}$, $Q_{180}$, and $Q_{270}$ in the certain frame and calculates by using Expression (4).

Next, the ToF sensor 23 measures a phase image in another frame (Step S302). In other words, the ToF sensor 23 measures the components $Q_0$, $Q_{90}$, $Q_{180}$, and $Q_{270}$ in another frame and calculates by using Expression (4).

Next, the moving subject detection unit 27 detects a moving subject position (e.g., the position of the moving subject) from the image captured by the ToF sensor 23 (Step S303).

Next, the estimation unit 28 calculates the deviation amount of the phase $\phi$ based on the phase images measured in Steps S301 and S302 (Step S304). Note that the position of the moving subject detected in Step S303 is excluded from the phase images used in Step S304.

Next, the estimation unit 28 estimates the modulation frequency $f_L$ of the light source 2 based on the deviation amount of the phase $\phi$ calculated in Step S304 (Step S305). Then, the control unit 30 selects one integer N from a plurality of integers set in advance as candidates (Step S306).

Next, control unit 30 adjusts modulation frequency $f_S$ based on the one integer N selected (Step S307). Then, the estimation unit 28 calculates a confidence value at the modulation frequency $f_S$ adjusted (Step S308).

Next, the estimation unit 28 determines whether confidence values for all candidate integers have been calculated (Step S309). Then, when the confidence values for all the candidate integers have not been calculated (Step S309, No), the control unit 30 selects another integer N (Step S310) and returns to the process in Step S307.

On the other hand, when the confidence values for all the candidate integers have been calculated (Step S309, Yes), the estimation unit 28 selects the integer N having the highest confidence value (Step S311).

Then, the estimation unit 28 estimates the modulation frequency $f_L$ of the light source 2 based on the selected integer N (Step S311). Finally, the adjustment unit 29 adjusts the modulation frequency $f_S$ of the distance measuring device 3 based on the modulation frequency $f_L$ of the light source 2 estimated in Step S311 (Step S312), and ends the process.

Solid-State Imaging Element

Figure 22:
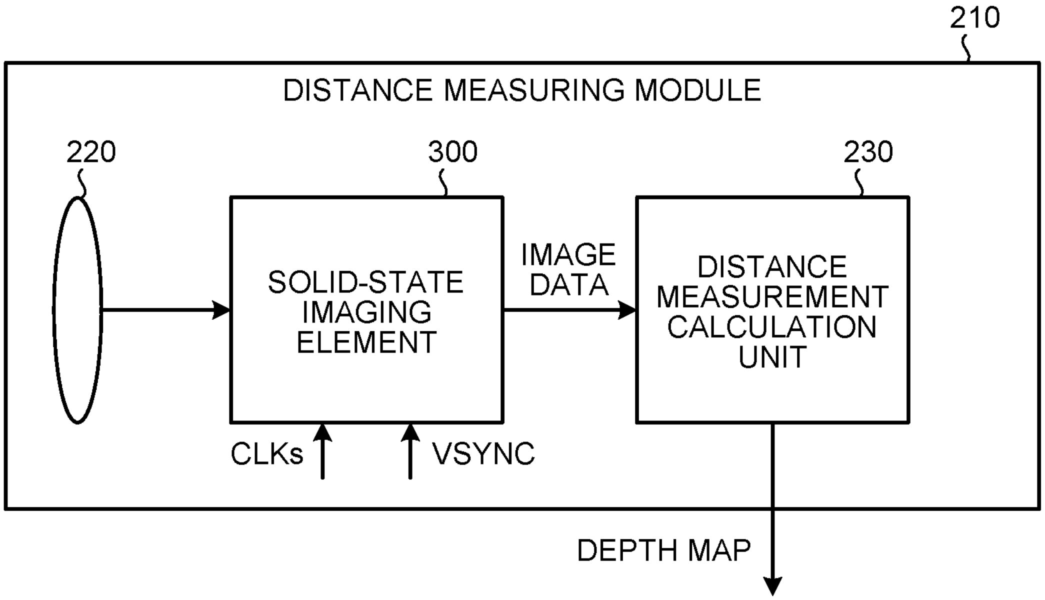
FIG. 22 is a block diagram illustrating a configuration example of a distance measuring module according to each embodiment of the present disclosure.

Next, a configuration example of a solid-state imaging element 300 according to each embodiment will be described with reference to FIG. 22 to FIG. 25. FIG. 22 is a block diagram illustrating a configuration example of a distance measuring module 210 according to each embodiment of the present disclosure.

As illustrated in FIG. 22, the distance measuring module 210 includes an imaging lens 220, the solid-state imaging element 300, and a distance measurement calculation unit 230. Note that the distance measuring module 210 is an example of the distance measuring device 3 (see FIG. 6) according to each embodiment. The solid-state imaging element 300 is an example of the ToF sensor 23 (see FIG. 6) according to each embodiment. The distance measurement calculation unit 230 is an example of the distance calculation unit 26 (see FIG. 6) according to each embodiment.

The imaging lens 220 condenses the emission light L1 (see FIG. 6) from the plurality of light source units 14*a*, 14*b*, and so on (see FIG. 6) and the reflected light L2 (see FIG.

6) from the emission light L1, and guides condensed light to the solid-state imaging element 300.

The solid-state imaging element 300 photoelectrically converts light from the imaging lens 220 to generate image data. A vertical synchronization signal VSYNC at a predetermined frequency and a reference clock CLKs are input to the solid-state imaging element 300.

A frequency of the vertical synchronization signal VSYNC is set to a value (60 hertz or the like) lower than a frequency (20 megahertz or the like) of the emission light L1 emitted by the plurality of light source units 14*a*, 14*b*, and so on. In addition, a frequency of the reference clock CLKs is set to the same value as the frequency of the emission light L1.

However, the reference clock CLKs is not synchronized with the emission light L1 of the plurality of light source units 14*a*, 14*b*, and so on, and a phase of the reference clock CLKs does not necessarily match with a phase of the emission light L1. The solid-state imaging element 300 generates the image data in synchronization with the vertical synchronization signal VSYNC or the like, and supplies the image data to the distance measurement calculation unit 230.

The distance measurement calculation unit 230 creates a depth map including information on the distance d to the object 4 based on the image data supplied from the solid-state imaging element 300, and outputs the depth map to outside.

Figure 23:
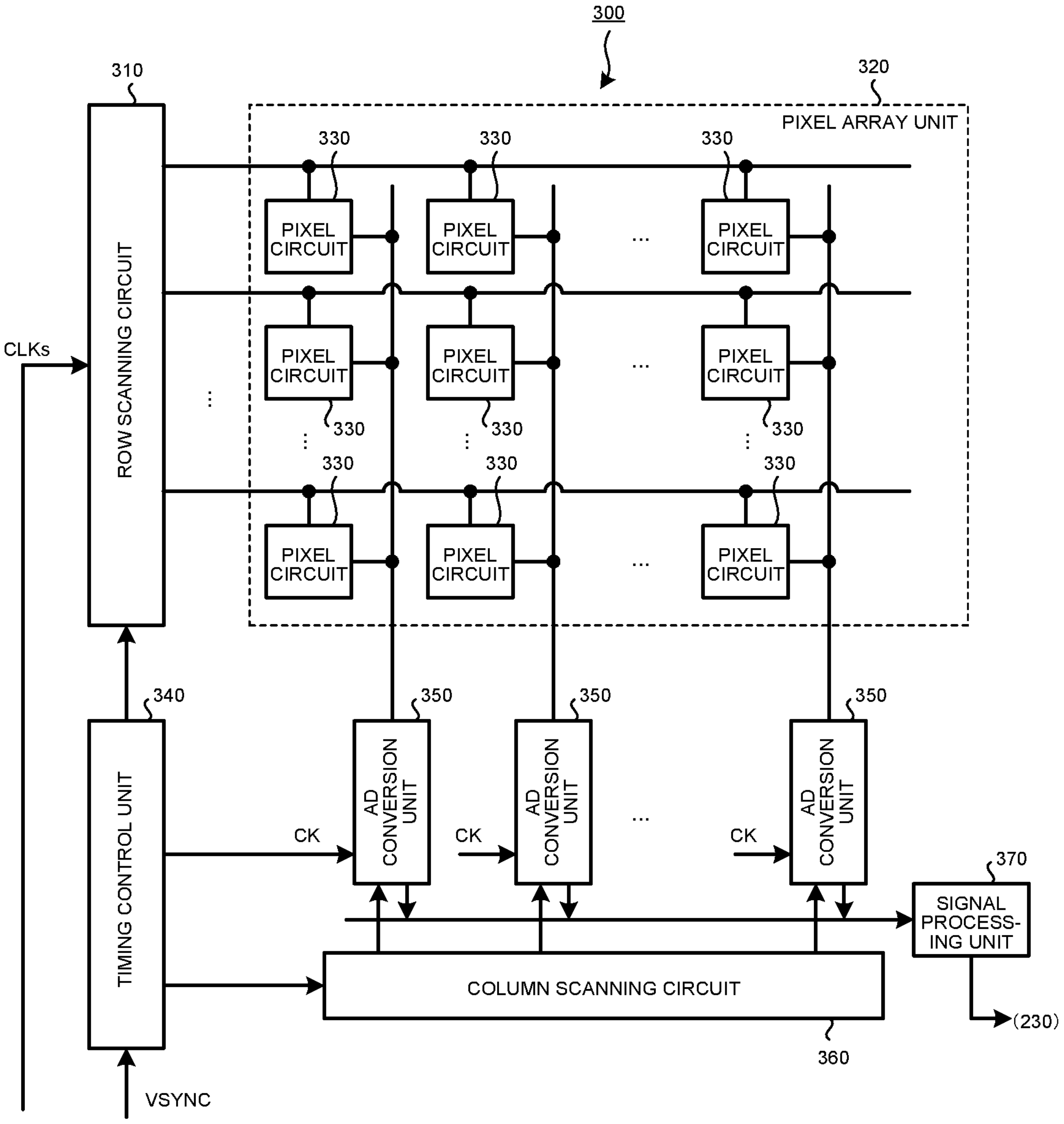
FIG. 23 is a block diagram illustrating a configuration example of a solid-state imaging element according to each embodiment of the present disclosure.

FIG. 23 is a block diagram illustrating a configuration example of the solid-state imaging element 300 according to each embodiment of the present disclosure. The solid-state imaging element 300 includes a row scanning circuit 310, a pixel array unit 320, a timing control unit 340, a plurality of analog to digital (AD) conversion units 350, a column scanning circuit 360, and a signal processing unit 370.

In the pixel array unit 320, a plurality of pixel circuits 330 is arranged in a two-dimensional lattice pattern. Hereinafter, a set of pixel circuits 330 arranged in a predetermined direction is referred to as a "row", and a set of pixel circuits 330 arranged in a direction perpendicular to the row is referred to as a "column". The AD conversion unit 350 described above is provided for each column.

The timing control unit 340 controls the row scanning circuit 310, the AD conversion unit 350, and the column scanning circuit 360 in synchronization with the vertical synchronization signal VSYNC.

The row scanning circuit 310 sequentially selects rows and outputs pixel signals. The pixel circuit 330 outputs a pixel signal at a level corresponding to the received light quantity according to control by the row scanning circuit 310.

The AD conversion unit 350 performs AD conversion of the pixel signals from corresponding columns. The AD conversion unit 350 outputs an AD-converted pixel signal to the signal processing unit 370 as pixel data according to control by the column scanning circuit 360. The column scanning circuit 360 sequentially selects the AD conversion units 350 and outputs the pixel data.

The signal processing unit 370 performs signal processing such as a correlated double sampling (CDS) process on the image data including the pixel data. The signal processing unit 370 supplies the image data after the signal processing to the distance measurement calculation unit 230.

Figure 24:
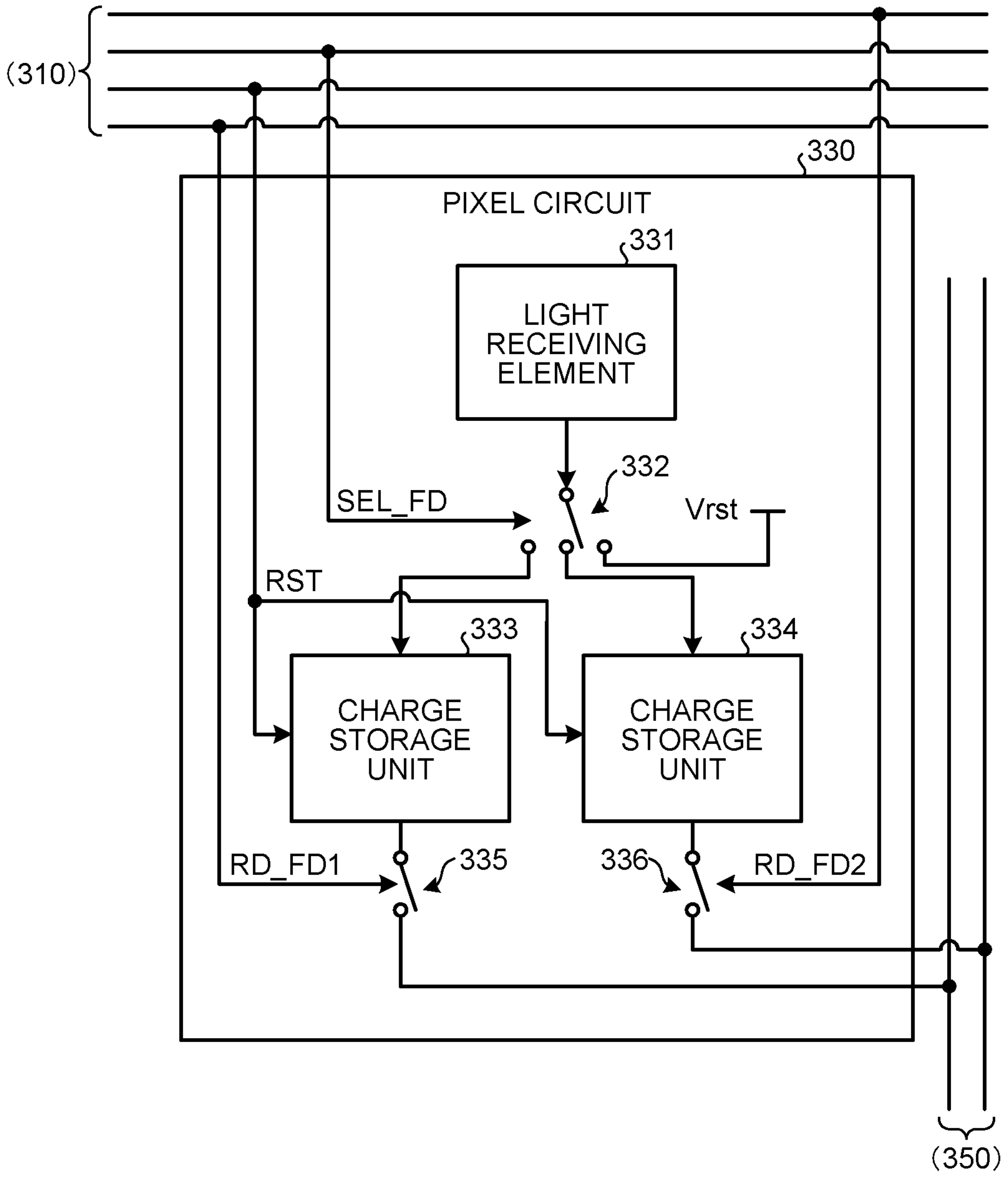
FIG. 24 is a block diagram illustrating a configuration example of a pixel circuit according to each embodiment of the present disclosure.

FIG. 24 is a block diagram illustrating a configuration example of the pixel circuit 330 according to each embodiment of the present disclosure. The pixel circuit 330 includes a light receiving element 331, a transfer switch 332, charge storage units 333 and 334, and selection switches 335 and 336.

The light receiving element 331 photoelectrically converts light to generate a charge. As the light receiving element 331, for example, a single photon avalanche diode (SPAD) element, a photodiode, or the like is used.

The transfer switch 332 connects the light receiving element 331 to any one of the charge storage unit 333, the charge storage unit 334, and the reset power supply Vrst according to the control by the row scanning circuit 310. Note that a "frequency on the ToF sensor 23 side" described in each embodiment is a cycle in which charges are distributed to the two charge storage units 333 and 334.

The transfer switch 332 is realized by, for example, a plurality of metal-oxide-semiconductor (MOS) transistors. When connected to the reset power supply Vrst, the charge output from the drain of the MOS transistor is discarded, and the charge of the light receiving element 331 is initialized.

The charge storage units 333 and 334 store charges and generate a voltage corresponding to the stored charge amount. For example, a floating diffusion layer is used as the charge storage units 333 and 334.

The selection switch 335 opens and closes a line between the charge storage unit 333 and the AD conversion unit 350 according to the control by the row scanning circuit 310. The selection switch 336 opens and closes a line between the charge storage unit 334 and the AD conversion unit 350 according to the control by the row scanning circuit 310.

For example, the selection switch 335 transits into a closed state when the row scanning circuit 310 supplies a FD read signal RD_FD1, and the selection switch 336 transits into a closed state when the row scanning circuit 310 supplies the FD read signal RD_FD2. Each of these selection switches 335 and 336 is realized by, for example, a MOS transistor or the like.

Figure 25:
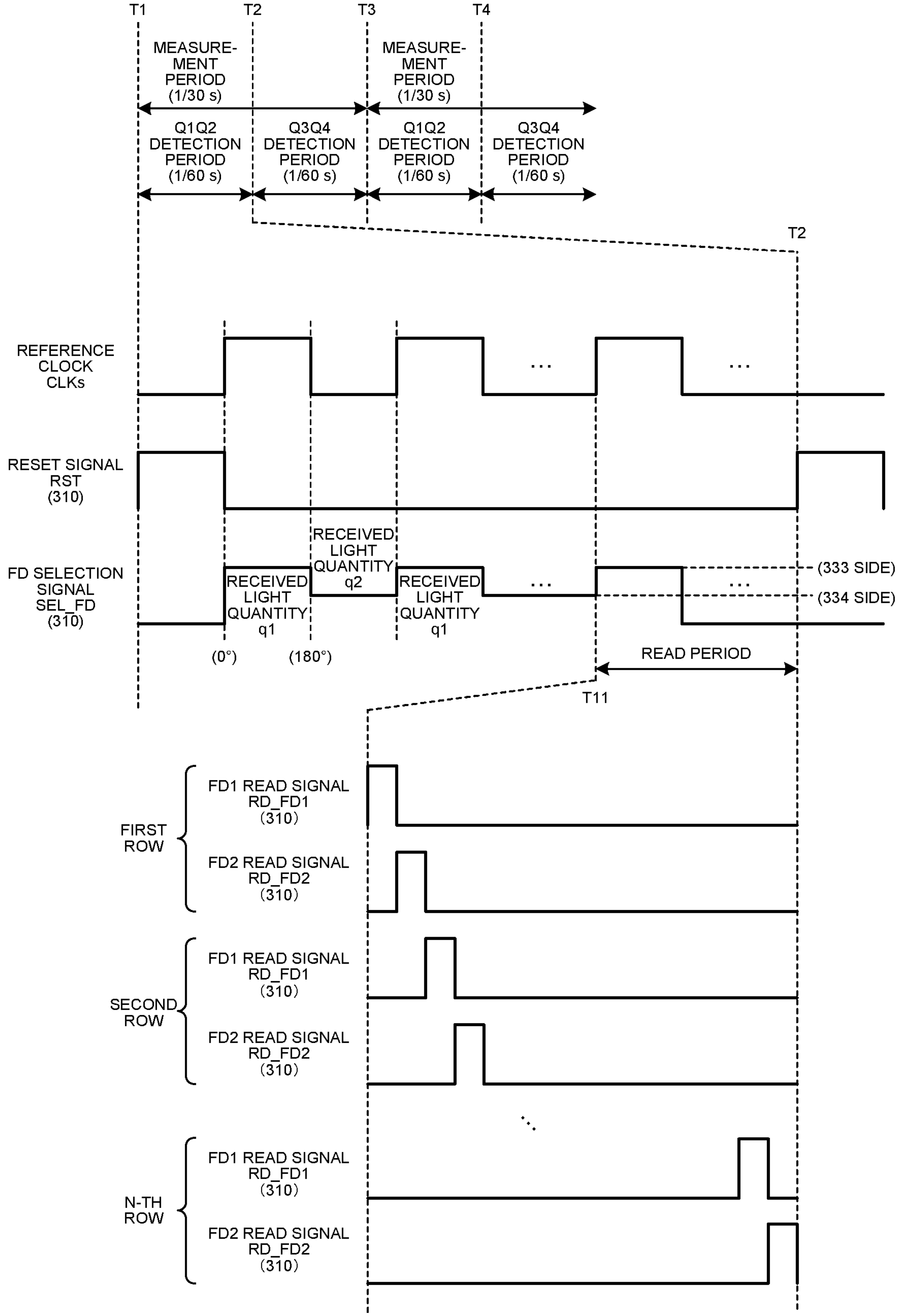
FIG. 25 is a timing chart illustrating an example of an operation of the solid-state imaging element during a Q1Q2 detection period according to each embodiment of the present disclosure.

FIG. 25 is a timing chart illustrating an example of operation of the solid-state imaging element during a Q1Q2 detection period according to each embodiment of the present disclosure. When a predetermined operation is performed to cause the distance measuring module 210 measure a distance, the pixel circuit 330 alternately and repeatedly detects received light quantities Q1 and Q2 and received light quantities Q3 and Q4.

Hereinafter, a detection period of the received light quantities Q1 and Q2 is referred to as a "Q1Q2 detection period", and a detection period of the received light quantities Q3 and Q4 is referred to as a "Q3Q4 detection period". In addition, a period including the Q1Q2 detection period and the Q3Q4 detection period is referred to as a "measurement period". A length of each of the Q1Q2 detection period and the Q3Q4 detection period is a cycle (e.g., 1/60 seconds) of the vertical synchronization signal VSYNC.

Here, the received light quantity Q1 is accumulation of received light quantities q1 from 0 degrees to 180 degrees over the Q1Q2 detection period with a specific phase (e.g., rise) of the reference clock CLKs as 0 degrees. Since the frequency of the reference clock CLKs is as high as 20 megahertz (MHz), the received light quantity q1 per cycle (1/20 microseconds) is very small, and it is difficult to detect the received light quantity q1.

Therefore, the pixel circuit 330 accumulates each q1 over the Q1Q2 detection period such as 1/60 seconds longer than the cycle (1/20 microseconds) of the reference clock CLKs, and detects the total as the received light quantity Q1. The received light quantity Q2 is accumulation of received light quantities q2 from 180 degrees to 360 degrees over the Q1Q2 detection period.

The received light quantity Q3 is accumulation of received light quantities q3 from 90 degrees to 270 degrees over the Q3Q4 detection period. The received light quantity Q4 is accumulation of received light quantities q4 from 270 degrees to 90 degrees over the Q3Q4 detection period.

By substituting these received light quantities Q1, Q2, Q3, and Q4 into the following Expression (47), the distance measurement calculation unit 230 can calculate a phase difference dP between the reference clock CLKs and the received light. A method of deriving this Expression is described in, for example, "Larry Li, "Time-of-Flight Camera—An Introduction", Texas Instruments, Technical White Paper SLOA 190B January 2014 Revised May 2014".

$$dP=\text{Arctan}\{(Q3-Q4)/(Q1-Q2)\} \tag{47}$$

For example, in the Q1Q2 detection period from a timing T1 to a timing T2, the received light quantities Q1 and Q2 in this period are detected. First, the row scanning circuit 310 supplies the reset signal RST to all the rows over a predetermined pulse period from the timing T1.

The reset signal RST initializes charge accumulation amounts in the charge storage units 333 and 334 of all rows. In addition, the row scanning circuit 310 initializes charges in the light receiving elements 331 in all rows by a FD selection signal SEL_FD.

Then, in the Q1Q2 detection period, the row scanning circuit 310 causes transfer of the charges generated by the light receiving element 331 to the charge storage unit 333 by the FD selection signal SEL_FD for all the rows from 0 degrees to 180 degrees in the cycle of the reference clock CLKs. By this control, the received light quantity q1 is accumulated in the charge storage unit 333.

Furthermore, in the Q1Q2 detection period, the row scanning circuit 310 causes transfer of the charge generated by the light receiving element 331 to the charge storage unit 334 by the FD selection signal SEL_FD for all rows from 180 degrees to 360 degrees in the cycle of the reference clock CLKs. By this control, the received light quantity q2 is accumulated in the charge storage unit 334.

Then, at a timing T11 immediately before the timing T2, the row scanning circuit 310 sequentially supplies the FD read signals RD_FD1 and RD_FD2 to the first row. By this control, the pixel signals corresponding to the received light quantities Q1 and Q2 of the first row are read.

Next, the row scanning circuit 310 sequentially supplies the FD read signals RD_FD1 and RD_FD2 to the second row and reads the pixel signals. Thereafter, similarly, the row scanning circuit 310 sequentially selects a row and reads the pixel signal.

As described above, in the Q1Q2 detection period, each of the pixel circuits 330 detects the received light quantity Q1 from 0 degrees to 180 degrees and the received light quantity Q2 from 180 degrees to 360 degrees.

Effects

The distance measuring device 3 according to the embodiments includes the ToF sensor 23, the distance calculation unit 26, the mode switching unit (control unit 30), and the estimation unit 28. The ToF sensor 23 has a device-specific clock that is the sensor clock 21 for controlling the photographing timing and is different from the light source clock 11 for controlling the light-emitting timing of the light source 2. The ToF sensor 23 reflects the emission light L1 of the light source 2 emitting the pulse light on the surface of the object 4 to perform photographing. The distance calculation unit 26 calculates the distance d to the object 4 based on the image data captured by the ToF sensor 23. The mode switching unit (control unit 30) switches the operation mode of the ToF sensor 23. The estimation unit 28 estimates the modulation frequency $f_L$ of the light source 2 generated from the light source clock 11 based on a plurality pieces of image data captured by switching the operation mode by the mode switching unit (control unit 30).

As a result, the modulation frequency $f_S$ of the ToF sensor 23 can be matched with the modulation frequency $f_L$ of the light source 2.

Furthermore, the distance measuring device 3 according to the embodiments further includes the adjustment unit 29 that adjusts the modulation frequency $f_S$ of the distance measuring device 3 generated from the sensor clock 21 based on the modulation frequency $f_L$ of the light source 2 estimated by the estimation unit 28.

As a result, the modulation frequency $f_S$ of the ToF sensor 23 can be matched with the modulation frequency $f_L$ of the light source 2.

Furthermore, in the distance measuring device 3 according to the embodiments, the mode switching unit (control unit 30) switches the frame rate of the ToF sensor 23 to a plurality of different frame rates. Furthermore, the estimation unit 28 estimates the modulation frequency $f_L$ of the light source 2 based on phase information of the plurality of pieces of image data captured at the plurality of different frame rates.

As a result, even when the modulation frequency $f_L$ of the light source 2 and the modulation frequency $f_S$ of the distance measuring device 3 are greatly deviated, the modulation frequency $f_S$ of the distance measuring device 3 can be matched with the modulation frequency $f_L$ of the light source 2.

In addition, in the distance measuring device 3 according to the embodiments, the mode switching unit (control unit 30) switches the modulation frequency $f_L$ of the light source 2 and the modulation frequency $f_S$ of the distance measuring device 3 to a plurality of different frequencies. Furthermore, the estimation unit 28 estimates the modulation frequency $f_L$ of the light source 2 based on the phase information of the plurality of pieces of image data captured at the plurality of different modulation frequencies.

As a result, even when the modulation frequency $f_L$ of the light source 2 and the modulation frequency $f_S$ of the distance measuring device 3 are greatly deviated, the modulation frequency $f_S$ of the distance measuring device 3 can be matched with the modulation frequency $f_L$ of the light source 2.

Furthermore, in the distance measuring device 3 according to the embodiments, the mode switching unit (control unit 30) changes the modulation frequency $f_L$ of the light source 2 or the modulation frequency $f_S$ of the distance measuring device 3 in increments of a predetermined frame rate.

As a result, useless search can be prevented.

The distance measuring system 1 according to the embodiments includes the light source clock 11 for controlling the modulation frequency of the light emission pulse, the light source 2 that emits the pulse light, and the distance measuring device 3 that measures the distance d to the object 4 using the emission light L1 of the light source 2. The distance measuring device 3 includes the ToF sensor 23, the distance calculation unit 26, the mode switching unit (control unit 30), and the estimation unit 28. The ToF sensor 23 has a device-specific clock that is the sensor clock 21 for controlling the photographing timing and is different from the light source clock 11. The ToF sensor 23 performs photographing by reflecting the emission light L1 of the light source 2 on the surface of the object 4. The distance calculation unit 26 calculates the distance d to the object 4 based on the image data captured by the ToF sensor 23. The mode switching unit (control unit 30) switches the operation modes of the light source 2 and the ToF sensor 23. The estimation unit 28 estimates the modulation frequency $f_L$ of the light source 2 generated from the light source clock 11 based on a plurality pieces of image data captured by switching the operation mode by the mode switching unit (control unit 30).

As a result, the modulation frequency $f_S$ of the ToF sensor 23 can be matched with the modulation frequency $f_L$ of the light source 2.

Furthermore, in the distance measuring system 1 according to the embodiments, the distance measuring device 3 further includes the adjustment unit 29. The adjustment unit 29 adjusts at least one of the modulation frequency $f_L$ of the light source 2 and the modulation frequency $f_S$ of the distance measuring device 3 generated from the sensor clock 21 based on the modulation frequency $f_L$ of the light source 2 estimated by the estimation unit 28.

As a result, the modulation frequency $f_S$ of the ToF sensor 23 can be matched with the modulation frequency $f_L$ of the light source 2.

Furthermore, in the distance measuring system 1 according to the embodiments, the mode switching unit (the control unit 30) switches the frame rate of the ToF sensor 23 to the plurality of different frame rates. Furthermore, the estimation unit 28 estimates the modulation frequency $f_L$ of the light source 2 based on phase information of the plurality of pieces of image data captured at the plurality of different frame rates.

As a result, even when the modulation frequency $f_L$ of the light source 2 and the modulation frequency $f_S$ of the distance measuring device 3 are greatly deviated, the modulation frequency $f_S$ of the distance measuring device 3 can be matched with the modulation frequency $f_L$ of the light source 2.

In addition, in the distance measuring system 1 according to the embodiments, the mode switching unit (control unit 30) switches the modulation frequency $f_L$ of the light source 2 and the modulation frequency $f_S$ of the distance measuring device 3 to the plurality of different frequencies. Furthermore, the estimation unit 28 estimates the modulation frequency $f_L$ of the light source 2 based on the phase information of the plurality of pieces of image data captured at the plurality of different modulation frequencies.

As a result, even when the modulation frequency $f_L$ of the light source 2 and the modulation frequency $f_S$ of the distance measuring device 3 are greatly deviated, the modulation frequency $f_S$ of the distance measuring device 3 can be matched with the modulation frequency $f_L$ of the light source 2.

In addition, in the distance measuring system 1 according to the embodiments, the mode switching unit (control unit 30) switches the modulation frequency $f_L$ of the light source 2 and the modulation frequency $f_L$ of the distance measuring device 3 to the plurality of different frequencies. In addition, the estimation unit 28 estimates the modulation frequency $f_L$ of the light source 2 based on the phase information of the image data captured at one modulation frequency and confidence values of the plurality of pieces of image data captured at the plurality of different modulation frequencies.

As a result, the modulation frequency $f_S$ of the ToF sensor 23 can be matched with the modulation frequency $f_L$ of the light source 2.

Furthermore, in the distance measuring system 1 according to the embodiments, the mode switching unit (control unit 30) changes the modulation frequency $f_L$ of the light source 2 or the modulation frequency $f_S$ of the distance measuring device 3 in increments of the predetermined frame rate.

As a result, useless search can be prevented.

Furthermore, in the distance measuring system 1 according to the embodiments, the light source 2 includes the communication unit 16 that receives, from the distance measuring device 3, information on the operation mode of the light source 2 set by the mode switching unit (control unit 30).

As a result, even in a case where the light source 2 and the distance measuring device 3 are configured separately, the information on the operation mode of the light source 2 can be received from the distance measuring device 3.

Furthermore, in the distance measuring system 1 according to the embodiments, the distance measuring device 3 includes the communication unit 31 that receives, from the light source 2, information on the operation mode of the light source 2. In addition, the mode switching unit (control unit 30) sets the operation mode of the distance measuring device 3 based on the operation mode of the light source 2 received by the communication unit 31.

As a result, even in a case where the light source 2 and the distance measuring device 3 are configured separately, the information on the operation mode of the light source 2 can be received from the light source 2.

The method of adjusting the distance measuring device 3 according to the embodiments includes the first photographing step, the mode switching step, the second photographing step, and the estimation step. The first photographing step uses the ToF sensor 23 having a device-specific clock that is the sensor clock 21 for controlling the photographing timing and is different from the light source clock 11 for controlling the modulation frequency of the light emission pulse of the light source 2. The ToF sensor 23 performs photographing by reflecting the emission light L1 of the light source 2 emitting the pulse light on the surface of the object 4. In the mode switching step, the operation mode of the ToF sensor 23 is switched. In the second photographing step, the ToF sensor 23 whose operation mode has been switched captures the object 4. In the estimation step, the modulation frequency $f_L$ of the light source 2 generated from the light source clock 11 is estimated based on the plurality of pieces of image data captured in the first photographing step and the second photographing step.

As a result, the modulation frequency $f_S$ of the ToF sensor 23 can be matched with the modulation frequency $f_L$ of the light source 2.

Although the embodiments of the present disclosure have been described above, the technical scope of the present disclosure is not limited to the above-described embodiments as it is, and various modifications can be made without departing from the gist of the present disclosure. In addition, components of different embodiments and modifications may be appropriately combined.

Note that the effects described in the present specification are merely examples and not limited, and other effects may be provided.

The present technology can also have the following configurations.

(1)

A distance measuring device comprising:

a ToF (time of flight) sensor configured to perform photographing by reflecting, on a surface of an object, emission light of a light source that emits pulse light, the ToF sensor having a sensor clock that controls a photographing timing, the sensor clock being a device-specific clock different from a light source clock that controls a modulation frequency of a light emission pulse of the light source;

a distance calculation unit configured to calculate a distance from the distance measuring device to the object based on image data captured by the ToF sensor;

a mode switching unit configured to switch an operation mode of the ToF sensor; and an estimation unit configured to estimate a modulation frequency of the light source generated from the light source clock based on a plurality of pieces of image data captured by switching the operation mode by the mode switching unit.

(2)

The distance measuring device according to (1), further comprising an adjustment unit configured to adjust a modulation frequency of the distance measuring device generated from the sensor clock based on the modulation frequency of the light source estimated by the estimation unit.

(3)

The distance measuring device according to (1) or (2), wherein the mode switching unit switches a frame rate of the ToF sensor to a plurality of different frame rates, and the estimation unit estimates the modulation frequency of the light source based on phase information of the plurality of pieces of image data captured at the plurality of different frame rates.

(4)

The distance measuring device according to (1) or (2), wherein the mode switching unit switches the modulation frequency of the light source and a modulation frequency of the distance measuring device to a plurality of different frequencies, and the estimation unit estimates the modulation frequency of the light source based on phase information of the plurality of pieces of image data captured at a plurality of different modulation frequencies.

(5)

The distance measuring device according to (1) or (2), wherein the mode switching unit switches the modulation frequency of the light source or a modulation frequency of the distance measuring device to a plurality of different frequencies, and the estimation unit estimates the modulation frequency of the light source based on phase information of image data captured at one modulation frequency and confidence values of the plurality of pieces of image data captured at a plurality of different modulation frequencies.

(6)

The distance measuring device according to (5), wherein the mode switching unit changes the modulation frequency of the light source and the modulation frequency of the distance measuring device in increments of a predetermined frame rate.

(7)

A distance measuring system comprising:

a light source having a light source clock that controls a modulation frequency of a light emission pulse, and configured to emit pulse light; and a distance measuring device configured to measure a distance to an object using emission light of the light source, wherein the distance measuring device includes:

a ToF (time of flight) sensor configured to perform photographing by reflecting, on a surface of the object, the emission light of the light source, the ToF sensor having a sensor clock that controls a photographing timing, the sensor clock being a device-specific clock different from the light source clock;

a distance calculation unit configured to calculate the distance to the object based on image data captured by the ToF sensor;

a mode switching unit configured to switch an operation mode of the light source and the ToF sensor; and an estimation unit configured to estimate a modulation frequency of the light source generated from the light source clock based on a plurality of pieces of image data captured by switching the operation mode by the mode switching unit.

(8)

The distance measuring system according to (7), wherein the distance measuring device further includes:

an adjustment unit configured to adjust at least one of the modulation frequency of the light source and a modulation frequency of the distance measuring device generated from the sensor clock based on the modulation frequency of the light source estimated by the estimation unit.

(9)

The distance measuring system according to (7) or (8), wherein the mode switching unit switches a frame rate of the ToF sensor to a plurality of different frame rates, and the estimation unit estimates the modulation frequency of the light source based on phase information of the plurality of pieces of image data captured at the plurality of different frame rates.

(10)

The distance measuring system according to (7) or (8), wherein the mode switching unit switches the modulation frequency of the light source and a modulation frequency of the distance measuring device to a plurality of different frequencies, and the estimation unit estimates the modulation frequency of the light source based on phase information of the plurality of pieces of image data captured at a plurality of different modulation frequencies.

(11)

The distance measuring system according to (7) or (8), wherein the mode switching unit switches the modulation frequency of the light source or a modulation frequency of the distance measuring device to a plurality of different frequencies, and the estimation unit estimates the modulation frequency of the light source based on phase information of image data captured at one modulation frequency and confidence values of the plurality of pieces of image data captured at a plurality of different modulation frequencies.

(12)

The distance measuring system according to (11), wherein the mode switching unit changes the modulation frequency of the light source and the modulation frequency of the distance measuring device in increments of a predetermined frame rate.

(13)

The distance measuring system according to any one of (7) to (12), wherein the light source includes a communication unit that receives, from the distance measuring device, information regarding the operation mode of the light source set by the mode switching unit.

(14)

The distance measuring system according to any one of (7) to (12), wherein the distance measuring device includes a communication unit that receives, from the light source, information regarding the operation mode of the light source, and the mode switching unit sets the operation mode of the distance measuring device based on the operation mode of the light source received by the communication unit.

(15)

A method of adjusting a distance measuring device, comprising:

first photographing using a ToF (time of flight) sensor to reflect, on a surface of an object, emission light of a light source that emits pulse light, the ToF sensor having a sensor clock that controls a photographing timing, the sensor clock being a device-specific clock different from a light source clock that controls a modulation frequency of a light emission pulse of the light source;

switching an operation mode of the ToF sensor;

second photographing using the ToF sensor to capture the object, the operation mode of the ToF sensor being switched; and estimating a modulation frequency of the light source generated from the light source clock based on a plurality of pieces of image data captured in the first photographing and the second photographing.

(16)

The method of adjusting the distance measuring device according to (15) further includes the adjustment step of adjusting the modulation frequency of the distance measuring device generated from the sensor clock based on the modulation frequency of the light source estimated in the estimation step.

(17)

The method of adjusting the distance measuring device according to (15) or (16) in which the mode switching step switches the frame rate of the ToF sensor to the plurality of different frame rates, and the estimation step estimates the modulation frequency of the light source based on the phase information of the plurality of pieces of image data captured at the plurality of different frame rates.

(18)

The method of adjusting the distance measuring device according to (15) or (16) in which the mode switching step switches the modulation frequency of the light source and the modulation frequency of the distance measuring device to the plurality of different frequencies, and the estimation step estimates the modulation frequency of the light source based on the phase information of the plurality of pieces of image data captured at the plurality of different modulation frequencies.

(19)

The method of adjusting the distance measuring device according to (15) or (16) in which the mode switching step switches the modulation frequency of the light source or the modulation frequency of the distance measuring device to the plurality of different frequencies, and the estimation step estimates the modulation frequency of the light source based on the phase information of the image data captured at one modulation frequency and the confidence values of the plurality of pieces of image data captured at the plurality of different modulation frequencies.

(20)

The method of adjusting the distance measuring device according to (19) in which the mode switching step changes the modulation frequency of the light source and the modulation frequency of the distance measuring device in increments of the predetermined frame rate.

(21)

The method of adjusting the distance measuring system includes the first photographing step of performing photographing by reflecting, on the surface of the object, the emission light of the light source emitting the pulse light by using the ToF (time of flight) sensor of the distance measuring device whose sensor clock for controlling the photographing timing is the device-specific clock different from the light source clock for controlling the modulation frequency of the emission pulse of the light source, the mode switching step of switching the operation mode of the ToF sensor, the second photographing step of photographing the object with the ToF sensor whose operation mode has been switched, and the estimation step of estimating the modulation frequency of the light source generated from the light source clock based on the plurality of pieces of image data captured in the first photographing step and the second photographing step.

(22)

The method of adjusting the distance measuring system according to (21) further includes the adjustment step of adjusting at least one of the modulation frequency of the light source and the modulation frequency of the distance measuring device generated from the sensor clock based on the modulation frequency of the light source estimated in the estimation step.

(23)

The method of adjusting the distance measuring system according to (21) or (22) in which the mode switching step switches the frame rate of the ToF sensor to the plurality of different frame rates, and the estimation step estimates the modulation frequency of the light source based on the phase information of the plurality of pieces of image data captured at the plurality of different frame rates.

(24)

The method of adjusting the distance measuring system according to (21) or (22) in which the mode switching step switches the modulation frequency of the light source and the modulation frequency of the distance measuring device to the plurality of different frequencies, and the estimation step estimates the modulation frequency of the light source based on the phase information of the plurality of pieces of image data captured at the plurality of different modulation frequencies.

(25)

The method of adjusting the distance measuring system according to (21) or (22) in which the mode switching step switches the modulation frequency of the light source and the modulation frequency of the distance measuring device to the plurality of different frequencies, and the estimation step estimates the modulation frequency of the light source based on the phase information of image data captured at one modulation frequency and confidence values of the plurality of pieces of image data captured at the plurality of different modulation frequencies.

(26)

The method of adjusting the distance measuring system according to (25) in which the mode switching step changes the modulation frequency of the light source and the modulation frequency of the distance measuring device in increments of the predetermined frame rate.

(27)

The method of adjusting the distance measuring system according to any one of (21) to (26) in which the light source includes the communication unit that receives, from the distance measuring device, information on the operation mode of the light source set in the mode switching step.

(28)

The method of adjusting the distance measuring system according to any one of (21) to (26) in which the distance measuring device includes the communication unit that receives, from the light source, information on the operation mode of the light source, and the mode switching step sets the operation mode of the distance measuring device based on the operation mode of the light source received by the communication unit.

REFERENCE SIGNS LIST

1 DISTANCE MEASURING SYSTEM
2 LIGHT SOURCE
3 DISTANCE MEASURING DEVICE
11 LIGHT SOURCE CLOCK
12 PLL CIRCUIT
16 COMMUNICATION UNIT
21 SENSOR CLOCK
22 PLL CIRCUIT
23 ToF SENSOR
28 ESTIMATION UNIT
29 ADJUSTMENT UNIT
30 CONTROL UNIT (EXAMPLE OF MODE SWITCHING UNIT)
31 COMMUNICATION UNIT
d DISTANCE
$f_L$, $f_S$ MODULATION FREQUENCY
L1 EMISSION LIGHT
L2 REFLECTED LIGHT

The invention claimed is:

1. A distance measuring device comprising:

a ToF (time of flight) sensor configured to perform imaging by reflecting, on a surface of an object, emission light of a light source that emits pulse light, the ToF sensor having a sensor clock that controls an imaging timing, the sensor clock being a device-specific clock different from a light source clock that controls a modulation frequency of a light emission pulse of the light source, wherein a first imaging is performed at a first operation mode having a first frame rate;

a distance calculation unit configured to calculate a distance to the object based on image data captured by the ToF sensor;

a mode switching unit configured to selectively switch operation modes of the ToF sensor between the first operation mode and a second operation mode having a second frame rate different from the first frame rate, wherein a second imaging is performed at the second operation mode; and an estimation unit configured to estimate a modulation frequency of the light source generated from the light source clock based on a plurality of pieces of image data captured in the first imaging at the first frame rate and the second imaging at the second frame rate, wherein the estimation unit calculates a first phase deviation amount between adjacent frames at the first frame rate, and calculates a first frequency deviation amount from the first phase deviation amount.

2. The distance measuring device according to claim 1, further comprising an adjustment unit configured to adjust a modulation frequency of the distance measuring device generated from the sensor clock based on the modulation frequency of the light source estimated by the estimation unit.

3. The distance measuring device according to claim 1, wherein the mode switching unit switches the modulation frequency of the light source and a modulation frequency of the distance measuring device to a plurality of different frequencies, and the estimation unit estimates the modulation frequency of the light source based on phase information of the plurality of pieces of image data captured at a plurality of different modulation frequencies.

4. The distance measuring device according to claim 1, wherein the mode switching unit switches the modulation frequency of the light source or a modulation frequency of the distance measuring device to a plurality of different frequencies, and the estimation unit estimates the modulation frequency of the light source based on phase information of image data captured at one modulation frequency and confidence values of the plurality of pieces of image data captured at a plurality of different modulation frequencies.

5. The distance measuring device according to claim 4, wherein the mode switching unit changes the modulation frequency of the light source and the modulation frequency of the distance measuring device in increments of a predetermined frame rate.

6. A distance measuring system comprising:

a light source having a light source clock that controls a modulation frequency of a light emission pulse, and configured to emit pulse light; and a distance measuring device configured to measure a distance to an object using emission light of the light source, wherein the distance measuring device includes:

a ToF (time of flight) sensor configured to perform imaging by reflecting, on a surface of the object, the emission light of the light source, the ToF sensor having a sensor clock that controls an imaging timing, the sensor clock being a device-specific clock different from the light source clock, wherein a first imaging is performed at a first operation mode having a first frame rate;

a distance calculation unit configured to calculate the distance to the object based on image data captured by the ToF sensor;

a mode switching unit configured to selectively switch operation modes of the light source and the ToF sensor between the first operation mode and a second operation mode having a second frame rate different from the first frame rate, wherein a second imaging is performed at the second operation mode; and an estimation unit configured to estimate a modulation frequency of the light source generated from the light source clock based on a plurality of pieces of image data captured in the first imaging at the first frame rate and the second imaging at the second frame rate, wherein the estimation unit calculates a first phase deviation amount between adjacent frames at the first frame rate, and calculates a first frequency deviation amount from the first phase deviation amount.

7. The distance measuring system according to claim 6, wherein the distance measuring device further includes:

an adjustment unit configured to adjust at least one of the modulation frequency of the light source and a modulation frequency of the distance measuring device generated from the sensor clock based on the modulation frequency of the light source estimated by the estimation unit.

8. The distance measuring system according to claim 6, wherein the mode switching unit switches the modulation frequency of the light source and a modulation frequency of the distance measuring device to a plurality of different frequencies, and the estimation unit estimates the modulation frequency of the light source based on phase information of the plurality of pieces of image data captured at a plurality of different modulation frequencies.

9. The distance measuring system according to claim 6, wherein the mode switching unit switches the modulation frequency of the light source or a modulation frequency of the distance measuring device to a plurality of different frequencies, and the estimation unit estimates the modulation frequency of the light source based on phase information of image data captured at one modulation frequency and confidence values of the plurality of pieces of image data captured at a plurality of different modulation frequencies.

10. The distance measuring system according to claim 9, wherein the mode switching unit changes the modulation frequency of the light source and the modulation frequency of the distance measuring device in increments of a predetermined frame rate.

11. The distance measuring system according to claim 6, wherein the light source includes a communication unit that receives, from the distance measuring device, information regarding the operation mode of the light source set by the mode switching unit.

12. The distance measuring system according to claim 6, wherein the distance measuring device includes a communication unit that receives, from the light source, information regarding the operation mode of the light source, and the mode switching unit sets the operation mode of the distance measuring device based on the operation mode of the light source received by the communication unit.

13. A non-transitory computer readable medium storing a program for operating a distance measuring device, the program being executable by a processor to perform operations comprising:

performing first imaging using a ToF (time of flight) sensor to reflect, on a surface of an object, emission light of a light source that emits pulse light, the ToF sensor having a sensor clock that controls an imaging timing, the sensor clock being a device-specific clock different from a light source clock that controls a modulation frequency of a light emission pulse of the light source, the first imaging being performed at a first operation mode having a first frame rate;

switching the first operation mode of the ToF sensor to a second operation mode having a second frame rate different from the first frame rate;

performing second imaging using the ToF sensor to capture the object, the operation mode of the ToF sensor being switched;

estimating a modulation frequency of the light source generated from the light source clock based on a plurality of pieces of image data captured in the first imaging at the first frame rate and the second imaging at the second frame rate; and calculating a first phase deviation amount between adjacent frames at the first frame rate, and calculating a first frequency deviation amount from the first phase deviation amount.

14. The distance measuring device according to claim 1, wherein the estimation unit calculates a second phase deviation amount between adjacent frames at the second frame rate, and calculates a second frequency deviation amount from the first phase deviation amount, and calculates a true frequency deviation amount using the first frequency deviation amount and the second frequency deviation amount.

15. The distance measuring system according to claim 7, wherein the estimation unit calculates a second phase deviation amount between adjacent frames at the second frame rate, and calculates a second frequency deviation amount from the first phase deviation amount, and calculates a true frequency deviation amount using the first frequency deviation amount and the second frequency deviation amount.

16. The non-transitory computer readable medium according to claim 13, wherein the operations further comprise:

calculating a second phase deviation amount between adjacent frames at the second frame rate, and calculates a second frequency deviation amount from the first phase deviation amount, and calculating a true frequency deviation amount using the first frequency deviation amount and the second frequency deviation amount.

17. A distance measuring device comprising:

a ToF (time of flight) sensor configured to perform imaging by reflecting, on a surface of an object, emission light of a light source that emits pulse light, the ToF sensor having a sensor clock that controls an imaging timing, the sensor clock being a device-specific clock different from a light source clock that controls a modulation frequency of a light emission pulse of the light source, wherein a first imaging is performed at a first operation mode having a first frame rate;

a distance calculation unit configured to calculate a distance to the object based on image data captured by the ToF sensor;

a mode switching unit configured to selectively switch operation modes of the ToF sensor between the first operation mode and a second operation mode having a second frame rate different from the first frame rate, wherein a second imaging is performed at the second operation mode; and an estimation unit configured to estimate a modulation frequency of the light source generated from the light source clock based on a plurality of pieces of image data captured in the first imaging at the first frame rate and the second imaging at the second frame rate, wherein the estimation unit is configured to estimate the modulation frequency of the light source by comparing a phase deviation between adjacent frames captured at the first frame rate with a phase deviation between adjacent frames captured at the second frame rate.

18. The distance measuring system according to claim 6, wherein the estimation unit is configured to estimate the modulation frequency of the light source by comparing a phase deviation between adjacent frames captured at the first frame rate with a phase deviation between adjacent frames captured at the second frame rate.

19. The non-transitory computer readable medium according to claim 13, wherein the operations further comprise:

estimating the modulation frequency of the light source by comparing a phase deviation between adjacent frames captured at the first frame rate with a phase deviation between adjacent frames captured at the second frame rate.

* * * * *